(12) United States Patent
Abrams, Jr.

(10) Patent No.: US 7,319,720 B2
(45) Date of Patent: Jan. 15, 2008

(54) STEREOSCOPIC VIDEO

(75) Inventor: Thomas Algie Abrams, Jr., Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 461 days.

(21) Appl. No.: 10/058,962

(22) Filed: Jan. 28, 2002

(65) Prior Publication Data

US 2003/0156188 A1    Aug. 21, 2003

(51) Int. Cl.
*H04B 1/66*  (2006.01)
*H04N 7/12*  (2006.01)
*H04N 11/02* (2006.01)
*H04N 11/04* (2006.01)

(52) U.S. Cl. ............................................. 375/240.12

(58) Field of Classification Search ........... 375/240.12, 375/240.13; 386/111, 126; 348/43
See application file for complete search history.

(56) References Cited

U.S. PATENT DOCUMENTS

| | | | | |
|---|---|---|---|---|
| 5,257,237 A * | 10/1993 | Aranda et al. | ......... | 365/230.05 |
| 5,495,576 A * | 2/1996 | Ritchey | ...................... | 345/420 |
| 5,612,735 A * | 3/1997 | Haskell et al. | ................ | 348/43 |
| 5,619,256 A * | 4/1997 | Haskell et al. | ................ | 348/43 |
| 5,625,408 A * | 4/1997 | Matsugu et al. | ............... | 348/42 |
| 5,652,616 A * | 7/1997 | Chen et al. | ..................... | 348/43 |
| 5,680,323 A * | 10/1997 | Barnard | ...................... | 715/720 |
| 6,020,901 A * | 2/2000 | Lavelle et al. | ............... | 345/545 |
| 6,041,345 A | 3/2000 | Levi et al. | | |
| 6,043,838 A * | 3/2000 | Chen | ........................... | 348/42 |
| 6,055,012 A * | 4/2000 | Haskell et al. | ................ | 348/48 |
| 6,072,831 A * | 6/2000 | Chen | ..................... | 375/240.03 |
| 6,108,005 A * | 8/2000 | Starks et al. | ................. | 345/419 |
| 6,144,701 A * | 11/2000 | Chiang et al. | .............. | 375/240 |
| 6,222,885 B1 | 4/2001 | Chaddha et al. | | |
| 6,377,625 B1 * | 4/2002 | Kim | ...................... | 375/240.08 |
| 6,456,340 B1 * | 9/2002 | Margulis | ..................... | 348/745 |
| 6,529,908 B1 * | 3/2003 | Piett et al. | ..................... | 707/10 |
| 6,560,651 B2 * | 6/2003 | Katz et al. | .................. | 709/229 |
| 6,574,423 B1 * | 6/2003 | Oshima et al. | ............. | 386/111 |
| 6,583,808 B2 * | 6/2003 | Boulanger et al. | ....... | 348/14.09 |
| 6,606,746 B1 | 8/2003 | Zdepski et al. | | |
| 6,703,988 B1 * | 3/2004 | Fergason | ........................ | 345/6 |
| 6,735,253 B1 * | 5/2004 | Chang et al. | .......... | 375/240.16 |
| 6,864,913 B2 | 3/2005 | Tarnoff et al. | | |
| 6,996,184 B2 | 2/2006 | Hamamatsu et al. | | |

OTHER PUBLICATIONS

"LCD Autostereoscopic Display!", StereoGraphics Corporation, 2001. 1 page.
"Real-time HD VTR I/O with the Sony HDCAM Software Codec", Discreet Logic, Inc., Apr. 1999, 2 pages.
"SpiRINT Workstation: Post Impressions Resolution Indipendent NT Workstation", Post Impressions Systems, Inc., Nov. 2000, 6 pages.
"AJ-HD3700H Multi-Format HD/SD VTR", Panasonic Broadcast & Television Systems Company, 2 pages.
"Voodoo Media Recorder", Phillips Broadcast, 5 pages.

* cited by examiner

*Primary Examiner*—Nhon Diep
(74) *Attorney, Agent, or Firm*—Lee & Hayes, PLLC

(57) ABSTRACT

Methods, devices, systems and/or storage media for stereoscopic video.

18 Claims, 17 Drawing Sheets

STEREOSCOPIC VIDEO

CROSS-REFERENCE TO RELATED APPLICATION

This application is related to an application entitled "Video and/or Audio Processing", to inventor Thomas Algie Abrams, Jr., assigned to Microsoft Corporation, filed concurrently on Jan. 28, 2002 and having Ser. No. 10/058,961, the contents of which are incorporated by reference herein.

TECHNICAL FIELD

This invention relates generally to methods, devices, systems and/or storage media for video and/or audio, especially for stereoscopic video.

BACKGROUND

The human brain allows for depth perception through binocular stereopsis, in part, by use of range estimates from a left eye perspective and a right eye perspective. In binocular stereopsis, a viewer's eyes register two images, a left eye image and a right eye image, which are transmitted to the brain for processing. The brain then processes the images to perceive a three-dimensional stereo image. One goal of computer vision and/or computer presentation is to provide a viewer with same or similar perception.

In general, a single computer displayed image cannot effectively provide a viewer with three-dimensional stereo image perception; instead, at least two images must be displayed, e.g., one for each eye. Ultimately, each displayed image should be of a high quality and in a storable and/or a streamable format. However, even in non-stereoscopic video a downward progression exists wherein the resolution, and hence quality, of content distributed to a viewer is much less than that of the original content. For example, a professional digital video camera may acquire image data at a resolution of 1280 pixel by 720 lines, a frame rate of 24 frames per second (fps) and a color depth of 24 bits. The acquisition rate for such content is approximately 530 million bits per second (Mbps); thus, two hours of filming corresponds to almost 4 trillion bits of data (Tb). For viewing, this content must be distributed at approximately 530 Mbps or downloaded as a file having a size of approximately 4 Tb. For stereoscopic viewing, using a scheme that requires video content for a left eye and video content for a right eye, the requirements typically double: an overall bit rate of approximately 1.6 billion bits per second (Gbps) and an overall file size of approximately 8 Tb. At present, bandwidths and recording media commonly used for commercial distribution of digital content cannot handle such requirements. Thus, re-sampling and/or compression need to be applied to reduce the bit rate and/or file size.

Perhaps the most widely used method of compression is specified in the MPEG-2 standard. Products such as digital television (DTV) set top boxes and DVDs are based on the MPEG-2 standard. As an example, consider a DVD player with a single sided DVD disk that can store approximately 38 Gb. To fit the aforementioned 2 hours of video onto this disk, consider first, a re-sampling process that downgrades the video quality to a format having a resolution of 720 pixel by 486 line, a frame rate of approximately 24 fps and a color depth of 16 bits. Now, instead of a bit rate of 530 Mbps and a file size of 4 Tb, the content has a bit rate of approximately 130 Mbps and a file size of approximately 1 Tb. However, for stereoscopic viewing, using a scheme that requires video content for a left eye and video content for a right eye, the requirements typically double: an overall bit rate of approximately 260 Mbps and an overall file size of approximately 2 Tb. To fit this 2 Tb of content on a 38 Gb single sided DVD disk, a compression ratio of approximately 60:1 is required. When storage of audio and sub-titles is desired, an even higher compression ratio, for example, of approximately 70:1, is required. In addition, to decode and playback the 38 Gb of compressed content in 2 hours, an average bit rate of approximately 5 Mbps is required.

In general, MPEG-2 compression ratios are typically confined to somewhere between approximately 8:1 and approximately 30:1, which some have referred to as the MPEG-2 compression "sweet spot". Further, with MPEG-2, transparency (i.e., no noticeable discrepancies between source video and reconstructed video) occurs only for conservative compression ratios, for example, between approximately 8:1 and approximately 12:1. Of course, such conservative compression ratios are inadequate to allow for storage of the aforementioned 260 Mbps, 2 hour stereoscopic video on a DVD disk. Thus, to achieve a high degree of transparency, source content is often pre-processed (e.g., re-sampled) prior to MPEG-2 compression or lower resolution source content is used, for example, 352 pixel by 480 lines at a frame rate of 24 fps and a color depth of 16 bits (a rate of approximately 64 Mbps). Two hours of such lower resolution content (a file size of approximately 450 Gb) requires a compression ratio of approximately 12:1 to fit a single sided 38 Gb DVD disk. However, for stereoscopic viewing, using a scheme that requires video content for a left eye and video content for a right eye, the requirements typically double: an overall bit rate of approximately 130 Mbps and an overall file size of approximately 900 Gb; thus, a compression ratio of approximately 24:1 is required to fit this stereoscopic content on a 38 Gb DVD disk.

In practice, for a variety of reasons, MPEG-2 compression ratios are typically around 30:1. For example, a reported MPEG-2 rate-based "sweet spot" specifies a bit rate of 2 Mbps for 352 pixel by 480 line and 24 fps content, which reportedly produces an almost NTSC broadcast quality result that is also a "good" substitute for VHS. To achieve a 2 Mbps rate for the 352 pixel by 480 line and 24 fps content requires a compression ratio of approximately 30:1, which again, is outside the conservative compression range. Thus, most commercial applications that rely on MPEG-2 for video have some degree of quality degradation and/or quality limitations. Further, to achieve a 2 Mbps rate for stereoscopic video, using a scheme that requires video content for a left eye and video content for a right eye, a compression ratio of approximately 60:1 is required, which is outside specifications of the reported almost NTSC broadcast quality result that is also a "good" substitute for VHS.

One way to increase video quality involves maintaining a higher resolution (e.g., maintaining more pixels). Another way to increase video quality involves use of better compression algorithms, for example, algorithms that maintain subjective transparency for compression ratios greater than approximately 12:1 and/or achieve VHS quality at compression ratios greater than 30:1. Of course, a combination of both higher resolution and better compression algorithms can be expected to produce the greatest increase in video quality. For example, for an exemplary stereoscopic display scheme that relies on video content for a left eye and video content for a right eye, it would be desirable to maintain as much of the 1280 pixel by 720 line resolution of the aforementioned digital video as possible, if not all of such content (or even higher resolution content); it would also be desirable to fit such content onto a single sided DVD disk or other disk. In addition, it would be desirable to transmit such content in a data stream. Technologies for accomplishing such tasks, as well as other tasks, are presented below.

SUMMARY

Various technologies are described herein that pertain generally to digital video, and, in particular, to stereoscopic video. Many of these technologies can lessen and/or eliminate the need for a downward progression in video quality. Other technologies allow for new manners of distribution and/or display of stereoscopic video. In general, various technologies described herein allow for compression, storage, transmission and/or display of stereoscopic video having a resolution of, for example, greater than approximately 352 pixel by approximately 480 line. In addition, various technologies described herein can provide DVD quality.

An exemplary method for displaying stereoscopic video includes receiving and/or requesting compressed left eye digital video data and compressed right eye digital video data; decompressing the compressed left eye digital video data and the compressed right eye digital video data to produce decompressed left eye digital video data and decompressed right eye digital video data; and displaying alternately on a display device the decompressed left eye digital video data and the decompressed right eye digital video data. Another exemplary method for producing stereoscopic video includes receiving and/or requesting left eye digital video data and right eye digital video data; compressing the left eye digital video data and the right eye digital video data to produce compressed left eye digital video data and compressed right eye digital video data; and transmitting and/or storing the compressed left eye digital video data and the compressed right eye digital video data. Yet other method, devices, systems and/or storage media are further described herein.

Additional features and advantages of the exemplary methods, devices, systems and/or media described herein will be made apparent from the following detailed description of illustrative embodiments, which proceeds with reference to the accompanying figures.

BRIEF DESCRIPTION OF THE DRAWINGS

A more complete understanding of the various methods and arrangements described herein, and equivalents thereof, may be had by reference to the following detailed description when taken in conjunction with the accompanying drawings wherein.

DETAILED DESCRIPTION

Figure 1:
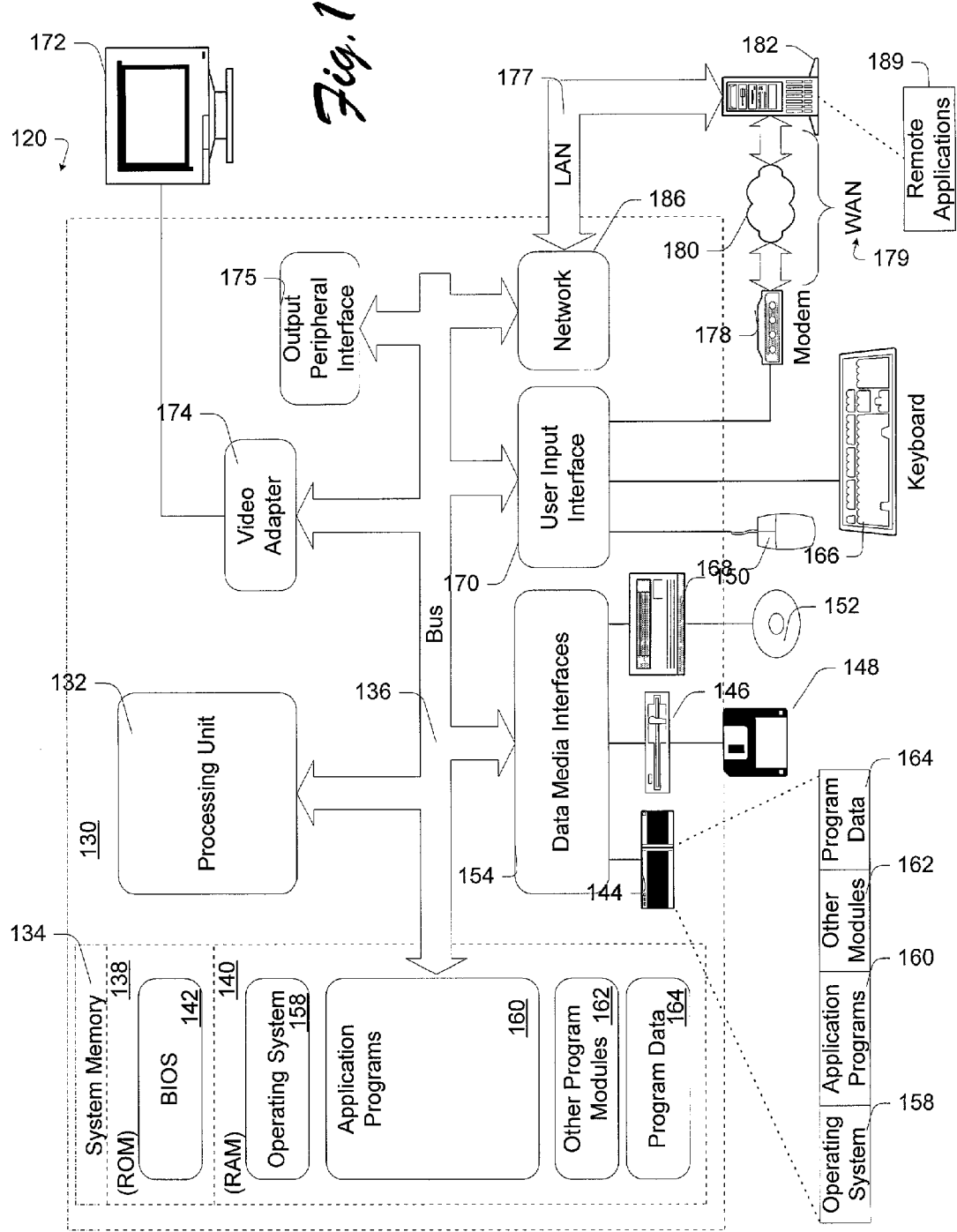
FIG. 1 is a block diagram generally illustrating an exemplary computer system on which the exemplary methods and exemplary systems described herein may be implemented.

Turning to the drawings, wherein like reference numerals refer to like elements, various methods are illustrated as being implemented in a suitable computing environment. Although not required, the methods will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the methods and converters may be practiced with other computer system configurations, including hand-held devices, multi-processor systems, microprocessor based or programmable consumer electronics, network PCs, minicomputers, mainframe computers, and the like. The methods may also be practiced in distributed computing environments where tasks are performed by remote processing devices that are linked through a communications network. In a distributed computing environment, program modules may be located in both local and remote memory storage devices.

In some diagrams herein, various algorithmic acts are summarized in individual "blocks". Such blocks describe specific actions or decisions that are made or carried out as the process proceeds. Where a microcontroller (or equivalent) is employed, the flow charts presented herein provide a basis for a "control program" or software/firmware that may be used by such a microcontroller (or equivalent) to effectuate the desired control of the stimulation device. As such, the processes are implemented as machine-readable instructions stored in memory that, when executed by a processor, perform the various acts illustrated as blocks.

Those skilled in the art may readily write such a control program based on the flow charts and other descriptions presented herein. It is to be understood and appreciated that the inventive subject matter described herein includes not only stimulation devices when programmed to perform the acts described below, but the software that is configured to program the microcontrollers and, additionally, any and all computer-readable media on which such software might be embodied. Examples of such computer-readable media include, without limitation, floppy disks, hard disks, CDs, RAM, ROM, flash memory and the like.

FIG. 1 illustrates an example of a suitable computing environment 120 on which the subsequently described exemplary methods may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The methods and arrangements herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Overview

Various technologies are described herein that pertain generally to digital video and, in particular, to stereoscopic video. Many of these technologies can lessen and/or eliminate the need for a downward progression in video quality. Other technologies allow for new manners of distribution and/or display of digital video, and in particular, stereoscopic video. As discussed in further detail below, such technologies include, but are not limited to: exemplary methods for producing a digital video stream and/or a digital video file; exemplary methods for producing a transportable storage medium containing digital video, in particular, stereoscopic video; exemplary methods for displaying digital video according to a stereoscopic display scheme; exemplary devices and/or systems for producing a digital video stream and/or a digital video file; exemplary devices and/or systems for storing digital video on a transportable storage medium; exemplary devices and/or systems for displaying digital video according to a stereoscopic video display scheme; and exemplary storage media for storing digital video.

Various exemplary methods, devices, systems, and/or storage media are described with reference to front-end, intermediate, back-end, and/or front-to-back processes and/or systems. While specific examples of commercially available hardware, software and/or media are often given throughout the description below in presenting front-end, intermediate, back-end and/or front-to-back processes and/or systems, the exemplary methods, devices, systems and/or storage media, are not limited to such commercially available items.

Figure 2:
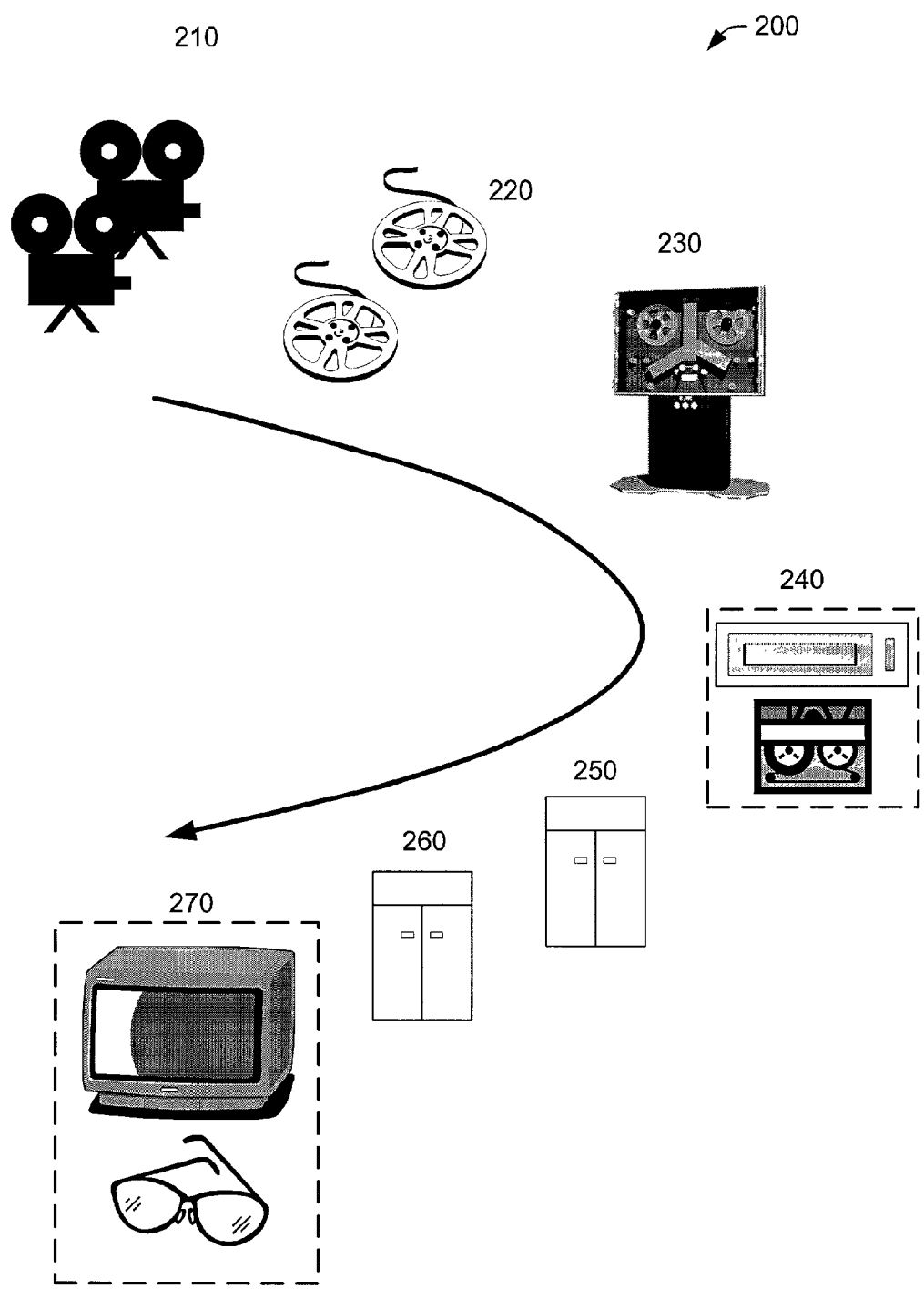
FIG. 2 is a block diagram illustrating an exemplary method for converting stereoscopic film images to streamable and/or storable digital data.

Referring to FIG. 2, a block diagram of an exemplary stereoscopic method 200 is shown. This exemplary method 200 is suitable for producing a stereoscopic display of images using a variety of technologies, some of which are described herein. Such technologies include, but are not limited to, WINDOWS MEDIA™ technologies. Various procedures in the stereoscopic method 200 typically account for display scheme characteristics. For example, as shown in FIG. 2, a display block 270 includes a display and eyewear that perform according to a suitable display scheme. A priori knowledge of the display scheme can enhance quality and/or facilitate production of stereoscopic images.

Stereoscopic 3D video display schemes can provide significant benefits in many areas, including entertainment, endoscopy and other medical imaging, remote-control vehicles and telemanipulators, games, stereo 3D CAD, molecular modeling, 3D computer graphics, 3D visualization, and video-based training. Stereoscopic, or stereo, viewing allows a viewer to perceive a depth dimension in images projected on a two-dimensional display device. In general, different views of a scene are presented to each eye wherein the views differ by, for example, a viewing offset that approximates the viewing angle difference between a viewer's left and right eyes when looking at, for example, a natural scene. A variety of exemplary stereoscopic displays schemes are presented below which are primarily used with a single display device. These and/or other exemplary schemes optionally use more than one display device to allow a viewer (or viewers) to perceive a 3D image.

For a viewer to perceive a 3D image through use of stereoscopic images on a display (or displays), each eye should see predominantly one image. One common way to present an image to each eye involves alternately displaying a left eye image and a right eye image while having the viewer wear a device that alternately blocks each eye synchronously with the display of the images. One such wearable device (or eyewear) is the CRYSTALEYES® device (StereoGraphics Corporation, San Rafael, Calif.), which includes synchronizing goggles that are driven by an infrared emitter box that connects to a special computer port. The CRYSTALEYES® device uses a stereo synchronization signal that is sent from a graphics display system to an emitter box, which sends an infrared signal to the goggles. This signal indicates whether the left or right eye image is being displayed so that the goggles can synchronize the opacity of eye lenses with the display. In general, alternating image display systems redraw at a high rate, so a viewer perceives left and right images nearly simultaneously. Common non-limiting exemplary rates are approximately 96 or approximately 120 fields per second (e.g., Hz) and usually depend on the stereo display scheme used.

Two common stereo display schemes are quad-buffered display (also known as stereo-in-a-window or stereo-ready) and full-screen display (also known as divided-screen, split-screen, or old-style). In full-screen stereo display, a display is divided into left eye portion and right eye portion. For example, a display may be divided into a top half and a bottom half (above-and-below display scheme) or a right half and a left half (side-by-side display scheme). In a top half and a bottom half display scheme half of the display's vertical resolution and the display's fall horizontal resolution are used for each image. For example, each image may have an image resolution format of 1280 pixels horizontal by 492 lines vertical for an overall image resolution format of 1280 pixel by approximately 1024 lines. In this example, left eye images are typically rendered in lines 0 to 491 and the right eye images are typically rendered in lines 532 to 1023 or 512 to 1003. In such display schemes, one dimension of an image may be displayed at approximately twice its original dimension. For example, a typical 1280 pixel by 1024 line display produces a ratio of horizontal to vertical pixels of about 1.3:1; thus, in the above-and-below display scheme for this resolution, the ratio of horizontal to vertical pixels for each eye is approximately 2.6:1, and the result is a pixel longer than it is high by a factor of approximately two. Software and/or hardware may account for such a discrepancy.

Quad-buffered stereo display schemes (or stereo-ready) generally use left and right buffers for stereo images. Quad-buffered stereo display schemes require a significant amount of framebuffer resources compared to full-screen stereo display schemes. In a typical quad-buffered stereo display scheme, image pixels are square (not distorted), and left and right eye images are rendered to the same pixel location on the display.

A typical stereo video format for a quad-buffered stereo display scheme is 1024 pixel by 768 line with a display rate of 96 Hz and a typical format for full-screen screen stereo is 1280 pixel by 492 line with a display rate of 120 Hz. In addition, a framebuffer may require a suitable depth (e.g., 16+16, 32+32, etc.) to enable quad-buffer stereo display. Such display schemes are supported by a variety of computers. For example, an exemplary commercially available SILICON GRAPHICS® OCTANE® 2 computer supports the following stereo image resolution formats: stereo-in-a-window display resolution formats 1280 pixel by 1024 line at 100 Hz and 1024 pixel by 768 line at 96 Hz; and full-screen formats 1280 pixel by 492 line at 114 Hz and 120 Hz.

Another display scheme is interlace stereo display, which uses interlace to encode left and right images on odd and even fields. Most interlace stereo display schemes can use standard television sets and monitors, standard VCRs, and inexpensive demultiplexing equipment (e.g., a simple field switch that shunts half the fields to one eye and half to the other by synching the shutters' eyewear to the field rate). Many interlace stereo display schemes result in flicker, which may be mitigated by reducing brightness of the image by adding neutral density filters to the eyewear.

Another problem associated with most interlace stereo display schemes is that each eye sees half the number of lines (or pixels) which are normally available, so the image has half the resolution. The interlace approach (or time-multiplexed low field rate approach) has an interesting application when used in conjunction with a head mounted display (HMD) using liquid crystal (LC) displays. Because of the long persistence of LC displays, a low number of longer lasting fields will produce a more or less flicker-free image. If a field switch is used to alternate fields to one and then the other LC display, the result can be a stereo image with a barely detectable flicker.

Yet another stereoscopic display scheme is white-line-code (WLC). The WLC is universal in the sense that it does not depend on field rate (refresh rate), resolution, or whether a display is in interlace scan mode or a progressive scan mode. In a WLC display scheme, white lines are added, typically on the bottom of every field for the last line of video, to signify whether the displayed image is a left eye image or a right eye image. Use of the last line of video is typical because it is within the province of a developer to add a code in this area immediately before the blanking area (which is not necessarily accessible to a developer). When an eyewear shutter system senses a white line, it can then trigger the eyewear shutter with, for example, a vertical sync pulse.

Table 1, below, lists several exemplary formats suitable for stereoscopic display schemes.

TABLE 1

Exemplary formats for stereoscopic display schemes.

| Format | Refresh rate (Hz) | Medium |
|---|---|---|
| Interlace | 60 | NTSC |
| Interlace | 50 | PAL |
| Side-by-side | 120 | NTSC |
| Side-by-side | 100 | PAL |
| Above-and-below | 120 | Computer |
| Stereo-ready | 120 | Computer |
| White-line-code | 70–90 | Computer |

Referring again to FIG. 2, the exemplary method 200 includes a shooting block 210. The shooting block 210 optionally includes use of a stereoscopic camera or two linked and/or synchronized cameras that can capture a right image and a left image (e.g., video for a left eye view and video for a right eye view). In the shooting block 210, a cinematographer uses a stereoscopic camera (or cameras) to film, or capture, images, or video, on, for example, photographic film. In general, the photographic film has an industry standard format, e.g., 70 mm, 35 mm, 16 mm, or 8 mm. Of course, specialized stereoscopic film may also be used wherein images are captured on or as adjacent frames.

Sound, or audio, recorded as an analog track and/or as a digital track on magnetic recording media and/or optical recording media, may also accompany the video. A photographic film may include magnetic recording media and optical recording media for audio recording. Common audio formats for film include, but are not limited to, 6 track/channel DOLBY DIGITAL® format (Dolby Laboratories Licensing Corporation, San Francisco, Calif.) and 8 track/channel SDDS SONY DYNAMIC DIGITAL SOUND® format (Sony Corporation, Tokyo, Japan). In addition, a 6 track/channel DTS® format (Digital Theatre Systems, Inc., Westlake Village, Calif.), a CD-based format, may also accompany a film. Of course, other CD-based systems may be used. Editing and/or rerecording optionally occur after filming to produce a final film and/or a near final film having analog video and optionally digital audio and/or analog audio. While the description herein generally refers to video, it is understood that audio may accompany video and that many formats and/or systems are equipped to handle both audio and video.

A stereoscopic camera or cameras optionally use a generator locking device (or genlock device) to enable locking or synchronizing of two or more images. In the photographic film example described above, a genlock device may record a locking or synchronizing signal on one or more films and/or another medium. For other image capture systems, a genlock device may enable video equipment (e.g., a TV, a recorder, an analyzer, etc.) to accept two signals simultaneously. For example, the STEREO3D™ video system (StereoGraphics, Inc.) uses two linked cameras which feed video signals to a record device, which may be located near the cameras or at some distance. If the record device is located near the cameras, a single composite NTSC channel may be sent via cable or broadcast to a remote location.

As shown in FIG. 2, in a film transfer block 220, the film is transferred to a telecine. However, in an alternative, a digital camera is used to optionally alleviate the need for analog film. A variety of digital cameras are commercially available, such as, but not limited to, SONY® digital cameras (Sony Corporation, Japan). Use of a digital camera can alleviate the need for an analog-to-digital conversion and/or substitute for analog-to-digital conversion. Exemplary SONY® digital cameras include, but are not limited to, the SONY™ HDW-F900 and HDW-700A digital cameras. The SONY® HDW-F900 digital camera features HAD CCD technology, which combines a 3-CCD HD color digital camera, a 12-bit A/D converter with advanced digital signal processing to deliver image resolution up to 1,920 pixels by 1,080 line. The SONY® HDW-700A digital camera is a 1080i (1080 line interlace) compliant 2 million-pixel RGB camera utilizing 10-bit digital signal processing. In addition, SONY® HDCAM equipment is optionally used for recording and/or processing (see blocks described below). Such equipment includes, but is not limited to, the SONY® HDW-F500 HDCAM editing VTR.

In the exemplary method 200, photographic film images are transferred to a telecine in a film transfer block 220. Following the film transfer block 220, in an analog-to-digital conversion block 230, a telecine (or equivalent device) converts analog video to digital video. Commercially available telecines include CCD telecines and CRT telecines and both types are suitable for the analog-to-digital conversion block 230. Telecines having digital capable of digital resolution in excess of 1920 pixels per line and/or 1080 lines are also suitable for use with various exemplary methods, devices and/or systems described herein.

Regarding digital video formats, Table 2, below, presents several commonly used digital video formats, including 1080×1920, 720×1280, 480×704, and 480×640, given as number of lines by number of pixels.

TABLE 2

Common Digital Video Formats

| Vertical Lines | Horizontal pixels | Aspect Ratio | Frame Rate s$^{-1}$ | Sequence p or i |
|---|---|---|---|---|
| 1080 | 1920 | 16:9 | 24, 30 | Progressive |
| 1080 | 1920 | 16:9 | 30, 60 | Interlaced |
| 720 | 1280 | 16:9 | 24, 30, 60 | Progressive |
| 480 | 704 | 4:3 or 16:9 | 24, 30, 60 | Progressive |
| 480 | 704 | 4:3 or 16:9 | 30 | Interlaced |
| 480 | 640 | 4:3 | 24, 30, 60 | Progressive |
| 480 | 640 | 4:3 | 30 | Interlaced |

Regarding high definition television (HDTV), such formats include 1,125 line, 1,080 line and 1,035 line interlace and 720 line and 1,080 line progressive formats in a 16:9 aspect ratio. According to some, a format is high definition if it has at least twice the horizontal and vertical resolution of the standard signal being used. There is a debate as to whether 480 line progressive is also "high definition"; it provides better resolution than 480 line interlace, making it at least an enhanced definition format. Various exemplary methods, devices systems, and/or storage media presented herein cover such formats and/or other formats.

In the analog-to-digital conversion block 230, the conversion device (e.g., telecine) outputs digital data in a suitable digital format, optionally according to a suitable standard for digital data transmission. While a variety of transmission standards exist, an exemplary suitable standard for digital data transmission is the Society of Motion Picture and Television Engineers (SMPTE) 292 standard ("Bit-Serial Digital Interface for High-Definition Television Systems"), which is typically associated with high definition systems (e.g., HDTV). In particular, the serial digital interface standard, SMPTE 292M, defines a universal medium of interchange for uncompressed digital data between various types of video equipment (camera's, encoders, VTRs, . . . ) at data rates of approximately 1.5 Gbps. Another exemplary suitable standard is the SMPTE 259M standard ("10-Bit 4:2:2 Component and 4fsc Composite Digital Signals—Serial Digital Interface"), which is typically associated with standard definition systems (e.g., SDTV). The SMPTE 259M standard includes a data transmission rate of approximately 0.27 Gbps. Suitable source formats for use with the SMPTE serial digital interface standards may include, but are not limited to, SMPTE 260M, 295M, 274M and 296M. Such formats may include a 10-bit YCbCr color space specification and a 4:2:2 sampling format and/or other color space specifications and/or sampling formats such as, for example, those described below. The various exemplary methods, devices, systems and/or storage media disclosed herein and equivalents thereof are not limited to the specifically mentioned SMPTE standards as other standards exist and/or are being created by organization such as the SMPTE. In addition, use of a non-standard transmission specification is also possible.

In general, digital video data typically has an 8-bit word and/or 10-bit word (also know as bits per sample) and a color space specification usually having an associated sampling format; this often results in an overall bits per pixel (or bit depth) of, for example, approximately 8, 16, 20, 24, 30 and 32. Of course, other word sizes and bit depths may exist and be suitable for use with various exemplary methods, devices, systems and/or storage media described herein. A variety of color space specifications also exist, including RGB, "Y, B-Y, R-Y", YUV, YPbPr and YCbCr. These are typically divided into analog and digital specifications, for example, YCbCr is associated with digital specifications (e.g., CCIR 601 and 656) while YPbPr is associated with analog specifications (e.g., EIA-770.2-a, CCIR 709, SMPTE 240M, etc.). The YCbCr color space specification has been described generally as a digitized version of the analog YUV and YPbPr color space specifications; however, others note that CbCr is distinguished from PbPr because in the latter the luma and chroma excursions are identical while in the former they are not. The CCIR 601 recommendation specifies an YCbCr color space with a 4:2:2 sampling format for two-to-one horizontal subsampling of Cb and Cr, to achieve approximately ⅔ the data rate of a typical RGB color space specification. In addition, the CCIR 601 recommendation also specifies that: 4:2:2 means 2:1 horizontal downsampling, no vertical downsampling (4 Y samples for every 2 Cb and 2 Cr samples in a scanline); 4:1:1 typically means 4:1 horizontal downsampling, no vertical downsampling (4 Y samples for every 1 Cb and 1 Cr samples in a scanline); and 4:2:0 means 2:1 horizontal and 2:1 vertical downsampling (4 Y samples for every Cb and Cr samples in a scanline.). The CCIR 709 recommendation includes an YPbPr color space for analog HDTV signals while the YUV color space specification is typically used as a scaled color space in composite NTSC, PAL or S-Video. Overall, color spaces such as YPbPr, YCbCr, PhotoYCC and YUV are mostly scaled versions of "Y, B-Y, R-Y" that place extrema of color difference channels at more convenient values. As an example, the digital data output from the analog-to-digital conversion block 230 optionally includes a 1080 line resolution format, a YCbCr color space specification, and is transmittable according to the SMPTE 292M standard. Of course, a variety of other resolution formats, color space specifications and/or transmission standards may be used. In general, a resolution, a frame rate, and a color space specification together with a sampling format will determine an overall bit rate.

Table 3 below lists a variety of video standards and associated bit rates.

TABLE 3

Exemplary video formats and associated information.

| Format | Pixels/line | Lines/frame | Pixels/frame | fps | Mps | Bits/pixel | Approx. Gbps |
|---|---|---|---|---|---|---|---|
| SVGA | 800 | 600 | 480,000 | 72 | 34.6 | 8 | 0.27 |
| NTSC | 640 | 480 | 307,200 | 30 | 9.2 | 24 | 0.22 |
| PAL | 580 | 575 | 333,500 | 50 | 16.7 | 24 | 0.40 |
| SECAM | 580 | 575 | 333,500 | 50 | 16.7 | 24 | 0.40 |

TABLE 3-continued

Exemplary video formats and associated information.

| Format | Pixels/line | Lines/frame | Pixels/frame | fps | Mps | Bits/pixel | Approx. Gbps |
|---|---|---|---|---|---|---|---|
| HDTV | 1920 | 1080 | 2,073,600 | 30 | 62.2 | 24 | 1.5 |
| Film* | 2000 | 1700 | 3,400,000 | 24 | 81.6 | 32 | 2.6 |

*Exemplary non-limiting film.

Another exemplary video standard not included in Table 3 is for video having a resolution of 1920 pixel by 1080 line, a frame rate of 24 fps, a 10-bit word and RGB color space with 4:2:2 sampling. Such video has on average 30 bits per pixel and an overall bit rate of approximately 1.5 Gbps. Yet another exemplary video standard not included in Table 2 is for video having a resolution of 1280 pixel by 720 line, a frame rate of 24 fps, a 10-bit word and a YCbCr color space with 4:2:2 sampling. Such video has on average 20 bits per pixel and an overall bit rate of approximately 0.44 Gbps. Note that a technique (known as 3:2 pulldown) may be used to convert 24 frames per second film to 30 frames per second video. According to this technique, every other film frame is held for 3 video fields resulting in a sequence of 3 fields, 2 fields, 3 fields, 2 fields, etc. Such a technique is optionally used in the analog-to-digital conversion block 230 or other blocks.

As shown in FIG. 2, digital data output from the analog-to-digital conversion block 230 are input to a digital recording block 240. The digital data output from the analog-to-digital conversion block 230 optionally includes left digital video data, right digital video data and/or left digital video data and right digital video data. According to the exemplary method 200, the digital recording block 240, while shown in FIG. 2, is optional. Alternatively, the digital data ouput from the analog-to-digital conversion block 230 are input directly to a computer or device (e.g., see device 810 of FIG. 8). The digital data is input to a computer or device as a single signal and/or as two signals, optionally via two inputs. In general, such a computer or device also includes storage capabilities. Referring again to FIG. 2, in the digital recording block 240, a recorder records digital data that includes video data, and optionally audio data, to a recording medium or media. For example, suitable recorders include, but are not limited to, tape-based and/or disk-based recorders. Exemplary non-limiting tape-based recorders include the Panasonic AJ-HD3700 D-5 HD multi-format recording system and the Philips DCR 6024 HDTV Digital Video Tape Recorder (also known as the Voodoo Media Recorder). Both of these commercially available recorders accept digital serial input according to the SMPTE 259M and/or SMPTE 292M transmission standards. Further, both recorders can preserve 1920 pixel×1080 line resolution.

The Panasonic AJ-HD3700 D-5 HD is a mastering-quality DTV/HDTV videotape recorder capable of performing mastering, high-definition cinema, television commercial and multi-format DTV and HDTV program production tasks. The AJ-HD3700 recorder can support standard definition and multiple high-definition video formats without hardware or software exchange, play back existing 525 line standard D-5 or D-5 HD cassettes and can record 10-bit uncompressed 480/60i standard-definition video with pre-read, in addition to 1080/24p/25p, 1080/60i, 1080/50i, and 720/60p high-definition standards. In addition the recorder can slew between 24 and 25 Hz frame rates for international (PAL) program duplication from a 1080/24p master. Both analog audio I/O and metadata recording and playback are supported as standard features. The D-5 standard is a 10-bit 4:2:2 non-compressed component digital video recorder and suitable for high-end post production as well as more general studio use. The D-5 HD standard (or HD D5 standard) provides for use of a compression algorithm to achieve about 4:1 lossless compression which may be suitable or acceptable for HDTV recordings.

The Philips Voodoo recorder can record a variety of formats, including HDTV (or DTV) 4:2:2 YCrCb sampled formats (e.g., 1920 pixels×1080 lines from 24p to 60i) without using any compression (24p is 24 fps progressive while 60i is 60 fps interlaced). The Philips Voodoo recorder is primarily based on the D6 recording format, which is a digital tape format that uses a 19 mm helical-scan cassette tape to record uncompressed high definition television material at 1.88 Gbps. The D6 standard includes SMPTE 277M and 278M standards and accepts both the European 1250/50 interlaced format and the Japanese 260M version of the 1125/60 interlaced format which uses 1035 active lines.

Other suitable devices suitable for use in the recording block 240 are marketed and/or sold under the mark ÀCCOM® (Àccom, Inc., Menlo Park, Calif.). For example, the ÀCCOM® WSD®/HD device can record high definition and/or standard definition video on to storage disks (e.g., using SCSI disk drives). Such devices are sometimes referred to as digital disk recorder (DDR) devices; thus, some DDR devices may be suitable for use as a recorder. The ÀCCOM® WSD®/HD device can record uncompressed high definition video using a 10-bit 4:2:2 color format; it supports full 10-bit uncompressed I/O and storage of ITU-R BT.601-4 (CCIR 601) standard definition formats and 720 line and 1080 line high definition formats. The ÀCCOM® WSD®/HD device can also use WINDOWS® file systems (e.g., NT® file system, 2000® file system, etc.) and/or the QUICKTIME® file format (Apple Computer, Inc., Cupertino, Calif.) for storage of video data. The ÀCCOM® WSD®/HD device optionally uses the QUICKTIME® file format as a native format for data storage. The QUICKTIME® file format includes two basic structures for storing information: classic atoms and QT atoms. Both classic atoms, which are simple atoms, and QT atoms, which are atom container atoms, allow for construction of arbitrarily complex hierarchical data structures. Atoms consist of a header, followed by atom data. An atom's header contains the atom's size and type fields, giving the size of the atom in bytes and its type. Because of the limitations of the classic atom structure, which require knowledge of offsets in to move through the atom tree, QT atoms are used which have an enhanced data structure that provide a more general-purpose storage format and remove some of the ambiguities that arise when using simple atoms. The QUICKTIME® file format supports storage of uncompressed (e.g., YCbCr or "YUV" 4:2:2, RGB, etc.) and compressed (JPEG, MPEG, etc.) video data. Of course, the recording block 240 is not limited to recorders that store data in a QUICKTIME® format. Another suitable, but non-limiting format is the WINDOWS MEDIA™ format, in addition, other formats may be suitable. Of course, a format may include compressed and/or uncompressed video data and/or other data.

As with the aforementioned exemplary non-limiting recorders, the ACCOM® WSD®/HD device can input and/or output digital video using a serial digital interface according to SMPTE standards (e.g., 259 M, 292M). For example, using the SMPTE 292M specification, the ACCOM® WSD®/HD device can input and/or output 10-bit high definition video at approximately 1.5 Gbps. The ACCOM® WSD®/HD device also has audio storage options wherein various formats support both video and audio. Disk-based storage options include Medea Corporation (Westlake Village, Calif.) 78 gigabyte (GB) VideoRAID/RT, e.g., for standard definition storage, and a plurality of VideoRAID/RTs, e.g., for high definition storage, wherein capacities can range from approximately 78 GB to over 10 terabyte (TB). As discussed in the background section, the 1280 pixel by 720 line 2 hour video required a file size of approximately 4 Tb, which is approximately 0.5 TB; hence recorders, whether tape-based and/or disk-based, should have sufficient storage capabilities. The ACCOM® WSD®/HD device supports gigabit Ethernet and/or WINDOWS® networking (e.g., WINDOWS® 2000® networking). According to the exemplary method 200, a recorder, which is optional, optionally includes a network interface, such as, Ethernet, WINDOWS® and/or other interface.

Yet other exemplary, non-limiting devices suitable for use in the digital recording block 240 include devices manufactured and/or sold by Post Impressions, Inc. (Culver City, Calif.) under the mark "spiRINT". The spiRINT diskstation device includes SDRAM (e.g., 1 GB), an input for SMPTE 292 transmission video, and arrays of storage disks (e.g., 3.2 TB). The spiRINT device may also run WINDOWS® operating systems (e.g., NT®, 2000®, etc.). The spiRINT device can input and/or output digital video using a serial digital interface according to SMPTE standards (e.g., 259 M, 292M). For example, using the SMPTE 292M specification, the spiRINT device can output 10-bit high definition video at approximately 1.5 Gbps. Use of devices having some or all of such features (e.g., features of Accom, Post Impressions, etc.) is described herein with respect to a variety of exemplary methods, devices, systems and/or storage media.

Referring again to FIG. 2, once the video data from the telecine has been recorded, the recorded video data are converted to another digital format in a digital-to-digital conversion block 250. In yet other exemplary methods described herein, however, a recorder optionally performs a digital-to-digital conversion. As shown in FIG. 2, a computer is configured to perform the digital-to-digital conversion. In general, the recorded digital video data are transmitted to the computer using a digital serial interface. . Of course, transmission through other methods may be used, for example, through a disk-based interface that allows for transfer of data from a recorder's disk to a computer. In yet another exemplary method, the recording block 240 of the exemplary method 200 is bypassed and an analog-to-digital conversion block inputs "unrecorded" digital data from the telecine (or the recorder) to the computer for further digital-to-digital conversion. In this alternative, for example, a telecine may transmit digital data to a computer using a digital serial interface that optionally complies with the SMPTE 292M standard or other standard. Of course, in various exemplary methods, audio data may also accompany the video data.

According to the exemplary method 200, a digital-to-digital conversion optionally involves converting some or all of the digital video data to a group or a series of individual or stereoscopically paired digital image files on a frame-by-frame and/or other suitable basis. Of course, in an alternative, not every frame is converted. According to an exemplary digital-to-digital conversion, the conversion process converts a frame of digital video data to a digital image file and/or frames of digital video data to a digital video file. Suitable digital image file formats include, but are not limited to, the tag image file format (TIFF), which is a common format for exchanging raster graphics (bitmap) images between application programs. The TIFF format is capable of describing bilevel, grayscale, palette-color, and full-color image data in several color spaces. The TIFF specification includes a number of compression schemes such as LZW compression, Joint Photographic Experts Group (JPEG) compression, and compression schemes specified by the International Telegraph and Telephone Consultative Committee (CCITT) (e.g., Group 3 and Group 4 schemes).

Regarding compression, algorithmic processes for compression generally fall into two categories: lossy and lossless. For example, algorithms based on the discrete cosine transform (DCT) are lossy whereas lossless algorithms are not DCT-based. A baseline JPEG lossy process, which is typical of many DCT-based processes, involves encoding by: (i) dividing each component of an input image into 8×8 blocks; (ii) performing a two-dimensional DCT on each block; (iii) quantizing each DCT coefficient uniformly; (iv) subtracting the quantized DC coefficient from the corresponding term in the previous block; and (v) entropy coding the quantized coefficients using variable length codes (VLCs). Decoding is performed by inverting each of the encoder operations in the reverse order. For example, decoding involves: (i) entropy decoding; (ii) performing a 1-D DC prediction; (iii) performing an inverse quantization; (iv) performing an inverse DCT transform on 8×8 blocks; and (v) reconstructing the image based on the 8×8 blocks. While the process is not limited to 8×8 blocks, square blocks of dimension $2^n \times 2^n$, where "n" is an integer, are preferred. A particular JPEG lossless coding process uses a spatial-prediction algorithm based on a two-dimensional differential pulse code modulation (DPCM) technique. The TIFF format supports a lossless Huffman coding process.

The TIFF specification also includes YCrCb, CMYK, RGB, CIE L*a*b* image definitions. Data for a single image may be striped or tiled. A combination of strip-orientated and tile-orientated image data, while potentially possible, is not recommended by the TIFF specification. In general, a high resolution image can be accessed more efficiently—and compression tends to work better—if the image is broken into roughly square tiles instead of horizontally-wide but vertically-narrow strips. Data for multiple images may also be tiled and/or striped in a TIFF format; thus, a single TIFF format file may contain data for a plurality of images. In particular, a single TIFF format file may contain data for a stereoscopic pair of images.

Referring again to FIG. 2, the computer used in the digital-to-digital conversion block 250 optionally comprises a computer having video processing software. The computer of conversion block 250 can be any suitable computer (computing device). Exemplary non-limiting computers include a SILICON GRAPHICS® O2+™ computer (Silicon Graphics, Inc., Mountain View, Calif.), a SILICON GRAPHICS® O2® computer, a SILICON GRAPHICS™ ONYX® computer, a SILICON GRAPHICS® 3000® computer, a SILICON GRAPHICS® Octane2™ computer or an equivalent thereof. The computer of block 250 optionally includes a graphics system. Suitable exemplary, non-limiting graphics systems include the InfiniteReality™ (e.g., IR2, IR3) graphics systems (Silicon Graphics, Inc.) and equivalents thereof. An exemplary graphic system optionally has multiple processor capability, e.g., consider the IR2 and IR3 graphics systems.

The computer of block 250 optionally comprises software such as, but not limited to, INFERNO® software (Discreet, Montreal, Quebec, Canada), and equivalents thereof. INFERNO® software is suitable for use with film, digital cinema, HDTV/DTV, high-resolution video tasks. In combination with a IR3 graphics system, a SILICON GRAPHICS® computer, and/or a SILICON GRAPHICS® video input/output (e.g., DMediaPro™ video input/output), INFERNO® software offers an environment for high-resolution (e.g., HDTV resolution) and feature film visual effects work including real-time 2K film playback and 12-bit support and input and/or output of both standard (e.g., SMPTE 259M standard) and high-definition (e.g., SMPTE 292M standard) video data. Similarly, FLAME® software on a SILICON GRAPHICS® computer (e.g., OCTANE®2), including serial digital I/O support for high-definition video, offers realtime HDTV I/O for most all popular HDTV formats including 720P, 1080i and 1080/24p. The SILICON GRAPHICS® DMediaPro™ video input/output devices support 4:2:2 and 4:4:4 YCrCb video sampling with 8 or 10 bits per component; 4:4:4 RGB video sampling with 8 or 10 bits per component; and full sample rate for alpha channel at 8 or 10 bits.

Other systems suitable for use in the digital-to-digital conversion block 250 include, but are not limited to, systems previously mentioned that are manufactured and/or sold by Accom, Inc. and/or Post Impressions, Inc. The spiRINT device of Post Impressions uses a "real-time" operating system (OS) embedded below a WINDOWS® NT® OS and has a high bandwidth low voltage differential signaling (LVDS) bus having dynamically switched bus architecture. The "real-time" OS includes a multi-format multi-resolution file system that enables files of any resolution and format to co-exist on the media storage and yet appear transparent to the NT® OS file system (NTFS). The WSD®/HD device of Accom has an OS independent control interface that allows for device control from essentially any workstation via, for example, a network connection. Alternatively, the control interface is accessed and run directly on the device, for example, with the aid of a monitor (e.g., a display panel, etc.). The Accom and Post Impressions devices can input 1.5 Gbps of HD format video data using a SMPTE 292M standard serial digital interface or 0.27 Gbps of SD format video data using a SMPTE 259M standard serial digital interface. Thus, such devices may interface a telecine and/or a recorder and/or, as mentioned previously, operate as a recorder. Use of such devices is further described in accordance with various exemplary methods, devices, systems and/or storage media that follow.

As already mentioned, in the digital-to-digital conversion block 250, software and a computer convert digital video data to a digital image file(s) or digital video file(s). Sometimes, such a process is referred to as "capture", wherein images are captured from digital video data—in either instance, a digital-to-digital conversion occurs. According to the exemplary method 200, digital video data from the telecine and/or the recorder may be compressed and/or uncompressed. The digital-to-digital conversion is optionally performed on a frame-by-frame basis, wherein each frame of digital video data transmitted from a telecine or a recorder is converted to a digital image file. Furthermore, a one-to-one correspondence is optionally maintained between each original analog (or digital) frame and a digital image file. However, a 3:2 pulldown or other type of pulldown or editing is also possible. A digital video file may also maintain a one-to-one correspondence between each original frame and frames in the digital video file; of course, other options also exist, such as, but not limited to, a 3:2 pulldown.

In an exemplary, non-limiting digital-to-digital conversion process (see, e.g., conversion block 250), digital video data are converted to image files, which are optionally recorded on a recording medium. For example, digital video data are transmitted according to the SMPTE 292M specification to a computer wherein the video data are converted to TIFF format files on a frame-by-frame or other suitable basis, wherein, during and/or after the conversion, the TIFF format files are recorded on digital linear tape (DLT). DLT is a form of magnetic tape and drive system used for storage of data. A compression algorithm, known as Digital Lempel Ziv 1 (DLZ1), facilitates storage and retrieval of data at high speeds and in large quantities. A DLT drive records data on a tape in dozens of straight-line (linear) tracks, usually 128 or 208. Some tape cartridges can hold 70 gigabytes (GB) of data when compression is used. A variant of DLT technology, called SuperDLT, makes it possible to store upwards of 100 GB on a single tape cartridge. A SuperDLT drive can transfer data at speeds of up to 10 megabytes per second (MBps). Exemplary alternative recording systems include linear tape open (LTO) drives, advanced intelligent tape (AIT) drives, and Mammoth drives.

Referring again to FIG. 2, a second conversion digital-to-digital conversion block 260 is shown. In this conversion block 260, digital data, e.g., produced by the conversion block 250, are converted to a format suitable for at least one file and/or at least one data stream suitable for execution on a computer to thereby produce a video display (e.g., a stereoscopic video display). For example, in an exemplary non-limiting conversion block (see, e.g., conversion block 260), a computer receives digital image files from a tape drive or another computer in a TIFF format. The TIFF format files are then converted to an audio video interleaved (AVI) format file, which is suitable for further conversion to another format as a file(s) and/or a stream(s). For example, an exemplary, non-limiting conversion block converts a AVI format file to a WINDOWS MEDIA™ format file and/or at least one data stream.

The AVI file format is a file format for digital video and audio for use with WINDOWS® OSs and/or other OSs. According to the AVI format, blocks of video and audio data are interspersed together. Although an AVI format file can have "n" number of streams, the most common case is one video stream and one audio stream. The stream format headers generally define the format (including compression) of each stream.

AVI format files may be made in several different ways. For example, VIDEDIT™ software or WINDOWS® MOVIE MAKER™ software (Microsoft Corporation) can create an AVI format file from image files. The VIDEDIT™ software uses bitmap image files, thus, TIFF format files need to be converted first to bitmap files. Once converted, VIDEDIT™ software assembles the bitmap images into an AVI format file, typically in an animation sequence. VID- EDIT™ can delete frames or add other frames or sequences. AVI format files can also be cropped or resized before being saved full sized or compressed. Such facilities are also provided by WINDOWS® MOVIE MAKER™ software, which can also use TIFF format files to create an AVI format file.

Referring again to FIG. 2, a primary function of the conversion block 260 is to produce a file and/or at least one data stream. Such a file and/or stream may be in a WINDOWS MEDIA™ format, which is a format capable of use in, for example, streaming audio, video and text from a server to a client computer. A WINDOWS MEDIA™ format file may also be stored and played locally. In general, a format may include more than just a file format and/or stream format specification. For example, a format may include codecs. Consider, as an example, the WINDOWS MEDIA™ format, which comprises audio and video codecs, an optional integrated digital rights management (DRM) system, a file container, etc. As referred to herein, a WINDOWS MEDIA™ format file and/or WINDOWS MEDIA™ format stream have characteristics of files suitable for use as a WINDOWS MEDIA™ format container file. Details of such characteristics are described below. In general, the term "format" as used for files and/or streams refers to characteristics of a file and/or a stream and not necessarily characteristics of codecs, DRM, etc. Note, however, that a format for a file and/or a stream may include specifications for inclusion of information related to codec, DRM, etc.

Figure 3:
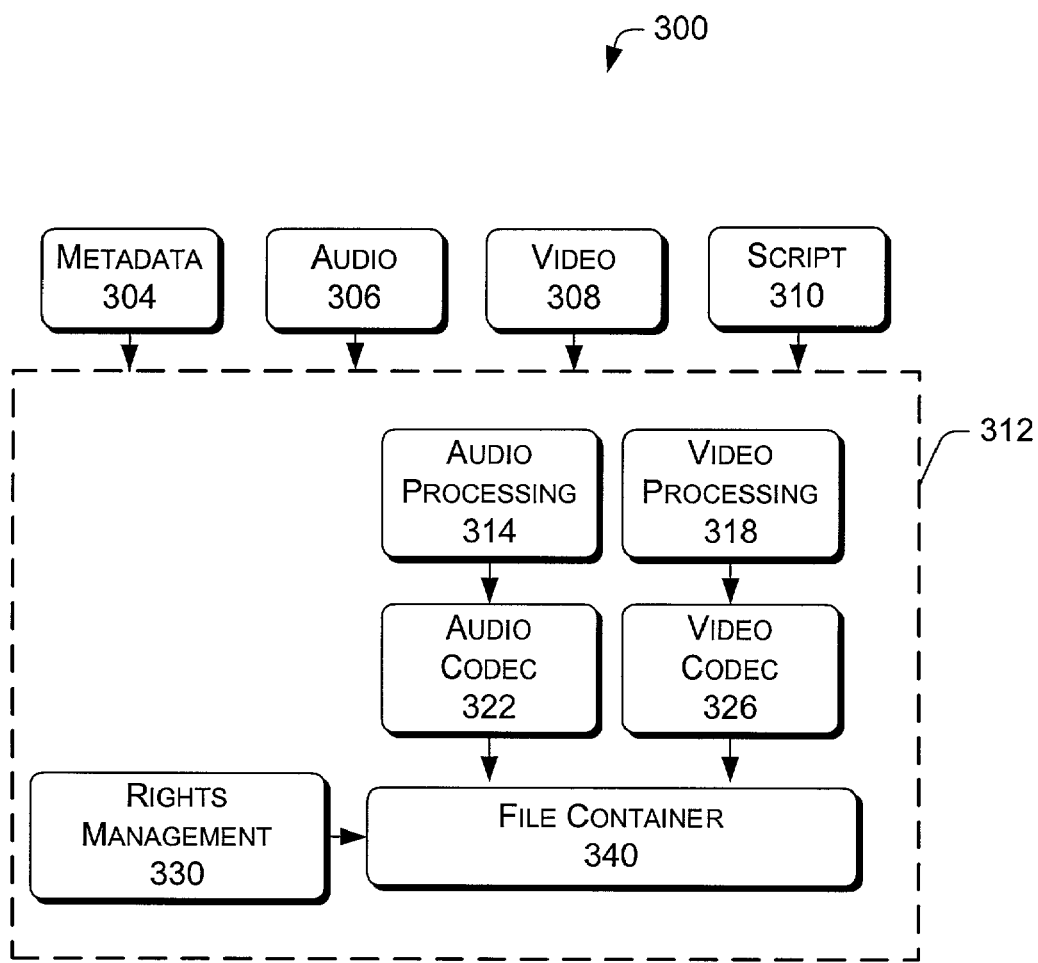
FIG. 3 is a block diagram illustrating an exemplary method for converting information to a particular format using video and/or audio codecs.

A block diagram of an exemplary conversion process for converting information to a suitable file and/or stream format 300 is shown in FIG. 3. Referring to FIG. 3, in the exemplary conversion process 300, a conversion block 312 accepts information from a metadata block 304, an audio block 306, a video block 308, and/or a script block 310. The information is optionally contained in an AVI format file and/or in a stream; however, the information may also be in an uncompressed WINDOWS MEDIA™ format or other suitable format. In an audio processing block 314 and in a video processing block 318, the conversion block 312 performs audio and/or video processing. Next, in an audio codec block 322 and in a video codec block 326, the conversion block 312 compresses the processed audio, video and/or other information and outputs the compressed information to a file container 340. Before, during and/or after processing and/or compression, a rights management block 330 optionally imparts information to the file container block 340 wherein the information is germane to any associated rights, e.g., copyrights, trademark rights, patent, etc., of the process or the accepted information.

The file container block 340 typically stores file information in a single file and optionally in more than one file. Of course, information may be streamed in a suitable format rather than specifically "stored". An exemplary, non-limiting file and/or stream has a WINDOWS MEDIA™ format. The term "WINDOWS MEDIA™ format", as used throughout, includes the active stream format and/or the advanced systems format, which are typically specified for use as a file container format. The active stream format and/or advanced systems format may include audio, video, metadata, index commands and/or script commands (e.g., URLs, closed captioning, etc.). In general, information stored in a WINDOWS MEDIA™ file container, will be stored in a file having a file extension such as .wma, .wmv, or .asf; streamed information may optionally use a same or a similar extension(s).

In general, a file (e.g., according to a file container specification) contains data for one or more streams that can form a multimedia presentation. Stream delivery is typically synchronized to a common timeline. A file and/or stream may also include a script, e.g., a caption, a URL, and/or a custom script command. As shown in FIG. 3, the conversion process 300 uses at least one codec or compression algorithm to produce a file and/or at least one data stream. In particular, such a process may use a video codec or compression algorithm and/or an audio codec or compression algorithm. Furthermore, the conversion block 260 optionally supports compression and/or decompression processes that can utilize a plurality of processors, for example, to enhance compression, decompression, and/or execution speed of a file and/or a data stream.

One suitable video compression and/or decompression algorithm (or codec) is entitled MPEG-4 v3, which was originally designed for distribution of video over low bandwidth networks using high compression ratios (e.g., see also MPEG-4 v2 defined in ISO MPEG-4 document N3056). The MPEG-4 v3 decoder uses post processors to remove "blockiness", which improves overall video quality, and supports a wide range of bit rates from as low as 10 kbps (e.g., for modem users) to 10 Mbps or more. Another suitable video codec uses block-based motion predictive coding to reduce temporal redundancy and transform coding to reduce spatial redundancy.

A suitable conversion software package that uses codecs is entitled WINDOWS MEDIA™ Encoder. The WINDOWS MEDIA™ Encoder software can compress live or stored audio and/or video content into WINDOWS MEDIA™ format files and/or data streams (e.g., such as the process 300 shown in FIG. 3). This software package is also available in the form of a software development kit (SDK). The WINDOWS MEDIA™ Encoder SDK is one of the main components of the WINDOWS MEDIA™ SDK. Other components include the WINDOWS MEDIA™ Services SDK, the WINDOWS MEDIA™ Format SDK, the WINDOWS MEDIA™ Rights Manager SDK, and the WINDOWS MEDIA™ Player SDK.

The WINDOWS MEDIA™ Encoder 7.1 software optionally uses an audio codec entitled WINDOWS MEDIA Audio 8 (e.g., for use in the audio codec block 322) and a video codec entitled WINDOWS MEDIA™ Video 8 codec (e.g., for use in the video codec block 326). The Video 8 codec uses block-based motion predictive coding to reduce temporal redundancy and transform coding to reduce spatial redundancy. Of course, later codecs, e.g., Video 9 and Audio 9, are also suitable. These aforementioned codecs are suitable for use in real-time capture and/or streaming applications as well as non-real-time applications, depending on demands. In a typical application, WINDOWS MEDIA™ Encoder 7.1 software uses these codecs to compress data for storage and/or streaming, while WINDOWS MEDIA™ Player software decompresses the data for playback. Often, a file or a stream compressed with a particular codec or codecs may be decompressed or played back using any of a variety of player software. In general, the player software requires knowledge of a file or a stream compression codec.

The Audio 8 codec is capable of producing a WINDOWS MEDIA™ format audio file of the same quality as a MPEG-1 audio layer-3 (MP3) format audio file, but at less than approximately one-half the size. While the quality of encoded video depends on the content being encoded, for a resolution of 640 pixel by 480 line, a frame rate of 24 fps and 24 bit depth color, the Video 8 codec is capable of producing 1:1 (real-time) encoded content in a WINDOWS MEDIA™ format using a computer having a processor speed of approximately 1 GHz. The same approximately 1 GHz computer would encode video having a resolution of 1280 pixel by 720 line, a frame rate of 24 fps and 24 bit depth color in a ratio of approximately 6:1 and a resolution of 1920 pixel by 1080 line, a frame rate of 24 fps and 24 bit depth color in a ratio of approximately 12:1 (see also the graph of FIG. 13 and the accompanying description). Essentially, the encoding process in these examples is processor speed limited. Thus, an approximately 6 GHz processor computer can encode video having a resolution of 1280 pixel by 720 line, a frame rate of 24 fps and 24 bit depth color in real-time; likewise, an approximately 12 GHz computer can encode video having a resolution of 1920 pixel by 1080 line, a frame rate of 24 fps and 24 bit depth color in real-time. Overall, the Video 8 codec and functional equivalents thereof are suitable for use in converting, streaming and/or downloading digital data. Of course, according to various exemplary methods, devices, systems and/or storage media described herein, video codecs other than the Video 8 may be used.

The WINDOWS MEDIA™ Encoder 7.1 supports single-bit-rate (or constant) streams and/or variable-bit-rate (or multiple-bit-rate) streams. Single-bit-rates and variable-bit-rates are suitable for some real-time capture and/or streaming of audio and video content and support of a variety of connection types, for example, but not limited to, 56 Kbps over a dial-up modem and 500 Kbps over a cable modem or DSL line. Of course, other higher bandwidth connections types are also supported and/or supportable. Thus, support exists for video profiles (generally assuming a 24 bit color depth) such as, but not limited to, DSL/cable delivery at 250 Kbps, 320×240, 30 fps and 500 Kbps, 320×240, 30 fps; LAN delivery at 100 Kbps, 240×180, 15 fps; and modem delivery at 56 Kbps, 160×120, 15 fps. The exemplary Video 8 and Audio 8 codecs are suitable for supporting such profiles wherein the compression ratio for video is generally at least approximately 50:1 and more generally in the range of approximately 200:1 to approximately 500:1 (of course, higher ratios are also possible). For example, video having a resolution of 320 pixel by 240 line, a frame rate of 30 fps and a color depth of 24 bits requires approximately 55 Mbps; thus, for DSL/cable delivery at 250 Kbps, a compression ratio of at least approximately 220:1 is required. Consider another example, a 1280×720, 24 fps profile at a color bit depth of 24 corresponds to a rate of approximately 0.53 Gbps. Compression of approximately 500:1 reduces this rate to approximately 1 Mbps. Of course, compression may be adjusted to target a specific rate or range of rates, e.g., 0.1 Mbps, 0.5 Mbps, 1.5 Mbps, 3 Mbps, 4.5 Mbps, 6 Mbps, 10 Mbps, 20 Mbps, etc. In addition, where bandwidth allows, compression ratios less than approximately 200:1 may be used, for example, compression ratios of approximately 30:1 or approximately 50:1 may be suitable. Of course, while an approximately 2 Mbps data rate is available over many LANs, even a higher speed LAN may require further compression to facilitate distribution to a plurality of users (e.g., at approximately the same time). Again, while these examples refer to the Video 8 and/or Audio 8 codecs, use of other codecs is also possible.

The Video 8 and Audio 8 codecs, when used with the WINDOWS MEDIA™ Encoder 7.1 may be used for capture, compression and/or streaming of audio and video content in a WINDOWS MEDIA™ format. Conversion of an existing video file(s) (e.g., AVI format files) to the WINDOWS MEDIA™ file format is possible with WINDOWS MEDIA™ 8 Encoding Utility software. The WINDOWS MEDIA™ 8 Encoding Utility software supports "two-pass" and variable-bit-rate encoding. The WINDOWS MEDIA™ 8 Encoding Utility software is suitable for producing content in a WINDOWS MEDIA™ format that can be downloaded and played locally.

As already mentioned, the WINDOWS MEDIA™ format optionally includes the active stream format and/or the advanced systems format. Various features of the active stream format are described in U.S. Pat. No. 6,041,345, entitled "Active stream format for holding multiple media streams", issued Mar. 21, 2000, and assigned to Microsoft Corporation ('345 patent). The '345 patent is incorporated herein by reference for all purposes, particularly those related to file formats and/or stream formats. The '345 patent defines an active stream format for a logical structure that optionally encapsulates multiple data streams, wherein the data streams may be of different media (e.g., audio, video, etc.). The data of the data streams is generally partitioned into packets that are suitable for transmission over a transport medium (e.g., a network, etc.). The packets may include error correcting information. The packets may also include clock licenses for dictating the advancement of a clock when the data streams are rendered. The active stream format can facilitate flexibility and choice of packet size and bit rate at which data may be rendered. Error concealment strategies may be employed in the packetization of data to distribute portions of samples to multiple packets. Property information may also be replicated and stored in separate packets to enhance error tolerance.

In general, the advanced systems format is a file format used by WINDOWS MEDIA™ technologies and it is generally an extensible format suitable for use in authoring, editing, archiving, distributing, streaming, playing, referencing and/or otherwise manipulating content (e.g., audio, video, etc.). Thus, it is suitable for data delivery over a wide variety of networks and is also suitable for local playback. In addition, it is suitable for use with a transportable storage medium, as described in more detail below. As mentioned, a file container (e.g., the file container 340) optionally uses an advanced systems format, for example, to store any of the following: audio, video, metadata (such as the file's title and author), and index and script commands (such as URLs and closed captioning); which are optionally stored in a single file. Various features of the advanced systems format appear in a document entitled "Advanced Systems Format (ASF)" from Microsoft Corporation (Doc. Rev. 01.13.00e—current as of 01.23.02). This document is a specification for the advanced systems format and is available through the Microsoft Corporation Web site (www.microsoft.com). The "Advanced Systems Format (ASF)" document (sometimes referred to herein as the "ASF specification") is incorporated herein by reference for all purposes and, in particular, purposes relating to encoding, decoding, file formats and/or stream formats.

An ASF file and/or stream typically includes three top-level objects: a header object, a data object, and an index object. The header object is commonly placed at the beginning of an ASF file or stream; the data object typically follows the header object; and the index object is optional, but it is useful in providing time-based random access into an ASF file. The header object generally provides a byte sequence at the beginning of an ASF file or stream (e.g., a GUID to identify objects and/or entities within a ASF file) and contains information to interpret information within the data object. The header object optionally contains metadata, such as, but not limited to, bibliographic information, etc.

An ASF file and/or stream may include information such as, but not limited to, the following: format data size (e.g., number of bytes stored in a format data field); image width (e.g., width of an encoded image in pixels); image height (e.g., height of an encoded image in pixels); bits per pixel; compression ID (e.g., type of compression); image size (e.g., size of an image in bytes); horizontal pixels per meter (e.g., horizontal resolution of a target device for a bitmap in pixels per meter); vertical pixels per meter (e.g., vertical resolution of a target device for a bitmap in pixels per meter); colors used (e.g., number of color indexes in a color table that are actually used by a bitmap); important colors (e.g., number of color indexes for displaying a bitmap); codec specific data (e.g., an array of codec specific data bytes).

The ASF also allows for inclusion of commonly used media types, which may adhere to other specifications. In addition, a partially downloaded ASF file may still function (e.g., be playable), as long as required header information and some complete set of data are available.

As mentioned, the WINDOWS MEDIA™ 8 Encoding Utility is capable of encoding content at variable bit rates. In general, encoding at variable bit rates may help preserve image quality of the original video because the bit rate used to encode each frame can fluctuate, for example, with the complexity of the scene composition. Types of variable bit rate encoding include quality-based variable bit rate encoding and bit-rate-based variable bit rate encoding. Quality-based variable bit rate encoding is typically used for a set desired image quality level. In this type of encoding, content passes through the encoder once, and compression is applied as the content is encountered. This type of encoding generally assures a high encoded image quality. Bit-rate-based variable bit rate encoding is useful for a set desired bit rate. In this type of encoding, the encoder reads through the content first in order to analyze its complexity and then encodes the content in a second pass based on the first pass information. This type of encoding allows for control of output file size. As a further note, generally, a source file must be uncompressed; however, compressed (e.g., AVI format) files are supported if an image compression manager (ICM) decompressor software is used.

Use of the Video 8 codec (or essentially any codec) due to compression and/or decompression computations places performance demands on a computer, in particular, on a computer's processor or processors. Demand variables include, but are not limited to, resolution, frame rate and bit depth. For example, a media player relying on the Video 8 codec and executing on a computer with a processor speed of approximately 0.5 GHz can decode and play encoded video (and/or audio) having a video resolution of 640 pixel by 480 line, a frame rate of approximately 24 fps and a bit depth of approximately 24. A computer with a processor of approximately 1.5 GHz could decode and play encoded video (and/or audio) having a video resolution of 1280 pixel by 720 line, a frame rate of approximately 24 fps and a bit depth of approximately 24; while, a computer with a processor of approximately 3 GHz could decode and play encoded video (and/or audio) having a video resolution of 1920 pixel by 1080 line, a frame rate of approximately 24 fps and a bit depth of approximately 24 (see also the graph of FIG. 14 and the accompanying description). Of course, for stereoscopic images, a stereoscopic display scheme may also be associated with demand variables.

Figure 4:
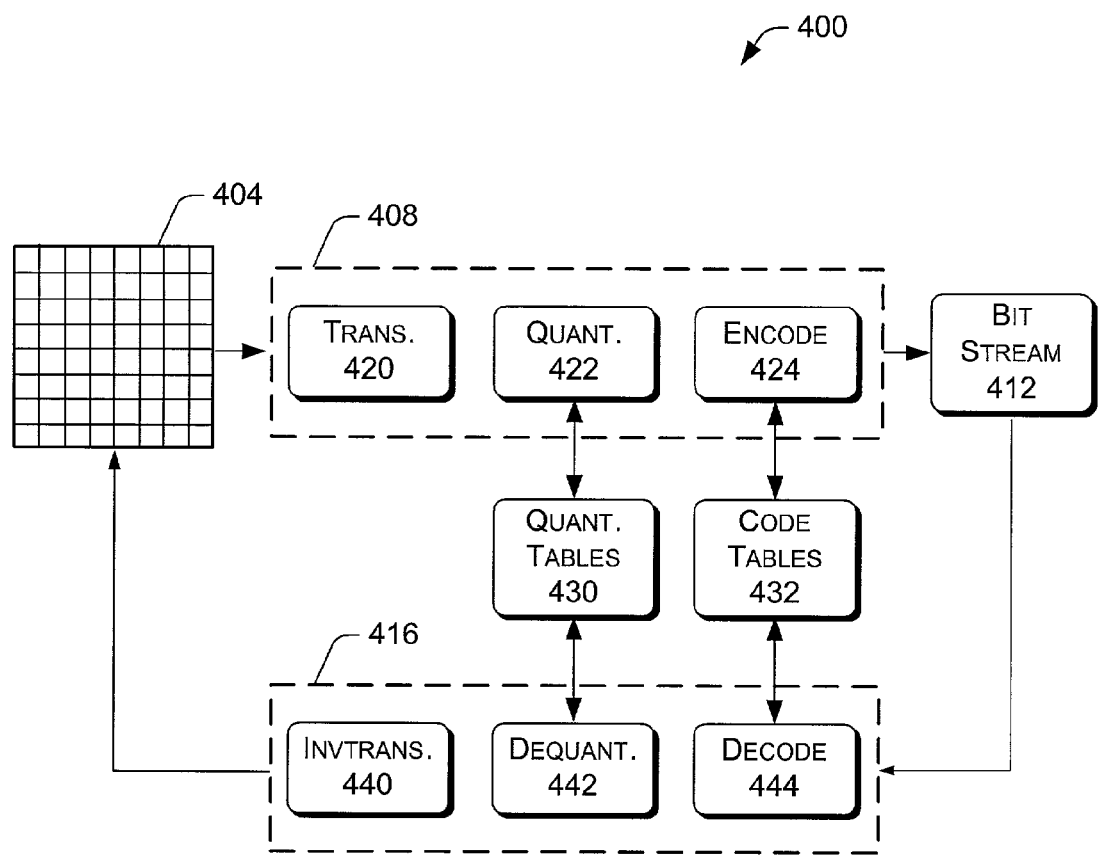
FIG. 4 is a block diagram illustrating an exemplary process for compression and decompression of image data.

A block diagram of an exemplary compression and decompression process 400 is shown in FIG. 4. In this exemplary compression and decompression process 400, an 8 pixel×8 pixel image block 404 from, for example, a frame of a 1920 pixel×1080 line image, is compressed in a compression block 408, to produce a bit stream 412. The bit stream 412 is then (locally and/or remotely, e.g., after streaming to a remote site) decompressed in a decompression block 416. Once decompressed, the 8 pixel×8 pixel image block 404 is ready for display, for example, as a pixel by line image.

Note that the compression block 408 and the decompression block 416 include several internal blocks as well as a shared quantization table block 430 and a shared code table block 432 (e.g., optionally containing a Huffman code table or tables). These blocks are representative of compression and/or decompression process that use a DCT algorithm (as mentioned above) and/or other algorithms. For example, as shown in FIG. 4, a compression process that uses a transform algorithm generally involves performing a transform on a pixel image block in a transform block 420, quantizing at least one transform coefficient in a quantization block 422, and encoding quantized coefficients in a encoding block 424; whereas, a decompression process generally involves decoding quantized coefficients in a decoding block 444, dequantizing coefficients in a dequantization block 442, and performing an inverse transform in an inverse transform block 440. As mentioned, the compression block 408 and/or the decompression block 416 optionally include other functional blocks. For example, the compression block 408 and the decompression block 416 optionally include functional blocks related to image block-based motion predictive coding to reduce temporal redundancy and/or other blocks to reduce spatial redundancy. In addition, blocks may relate to data packets. Again, the WINDOWS MEDIA™ format is typically a packetized format in that a bit stream, e.g., the bit stream 412, would contain information in a packetized form. In addition, header and/or other information are optionally included wherein the information relates to such packets, e.g., padding of packets, bit rate and/or other format information (e.g., error correction, etc.). In general, the exemplary method for producing at least one stream 200 produces at least one bit stream such as the bit stream 412 shown in FIG. 4.

Compression and/or decompression processes may also include other features to manage the data. For example, sometimes every frame of data is not fully compressed or encoded. According to such a process frames are typically classified, for example, as a key frame or a delta frame. A key frame may represent frame that is entirely encoded, e.g., similar to an encoded still image. Key frames generally occur at intervals, wherein each frame between key frames is recorded as the difference, or delta, between it and previous frames. The number of delta frames between key frames is usually determinable at encode time and can be manipulated to accommodate a variety of circumstances. Delta frames are compressed by their very nature. A delta frame contains information about image blocks that have changed as well motion vectors (e.g., bidirectional, etc.), or information about image blocks that have moved since the previous frame. Using these measurements of change, it might be more efficient to note the change in position and composition for an existing image block than to encode an entirely new one at the new location. Thus delta frames are most compressed in situations where the video is very static. As already explained, compression typically involves breaking an image into pieces and mathematically encoding the information in each piece. In addition, some compression processes optimize encoding and/or encoded information. Further, other compression algorithms use integer transforms that are optionally approximations of the DCT, such algorithms may also be suitable for use in various exemplary methods, devices, systems and/or storage media described herein. In addition, a decompression process may also include post-processing.

Referring again to FIG. 2, the conversion process 260 optionally produces a bit stream capable of carrying variable-bit-rate and/or constant-bit-rate video and/or audio data in a particular format. As already discussed, bit streams are often measured in terms of bandwidth and in a transmission unit of kilobits per second (Kbps), millions of bits per second (Mbps) or billions of bits per second (Gbps). For example, an integrated services digital network line (ISDN) type T-1 can, at the moment, deliver up to 1.544 Mbps and a type E1 can, at the moment, deliver up to 2.048 Mbps. Broadband ISDN (BISDN) can support transmission from 2 Mbps up to much higher, but as yet unspecified, rates. Another example is known as digital subscriber line (DSL) which can, at the moment, deliver up to 8 Mbps. A variety of other examples exist, some of which can transmit at bit rates substantially higher than those mentioned herein. For example, Internet2 can support data rates in the range of approximately 100 Mbps to several gigabytes per second. The exemplary method 200 optionally provides bit streams at a variety of rates, including, but not limited to, approximately 1.5 Mbps, 3 Mbps, 4.5 Mbps, 6 Mbps, and 10 Mbps. Such bit streams optionally include video data having a pixel by line format and/or a frame rate that corresponds to a common digital video format as listed in Table 2.

Figure 5:
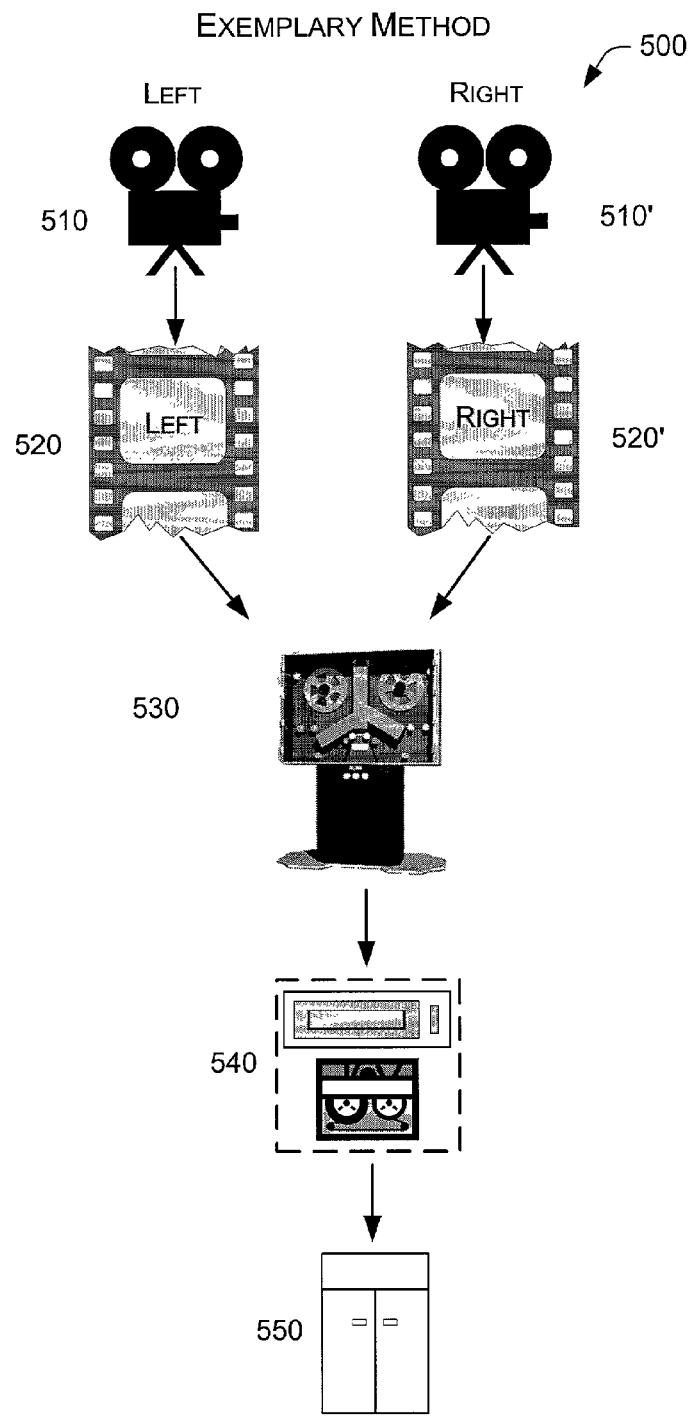
FIG. 5 is a block diagram illustrating an exemplary method for producing stereoscopic video data.
Figure 6:
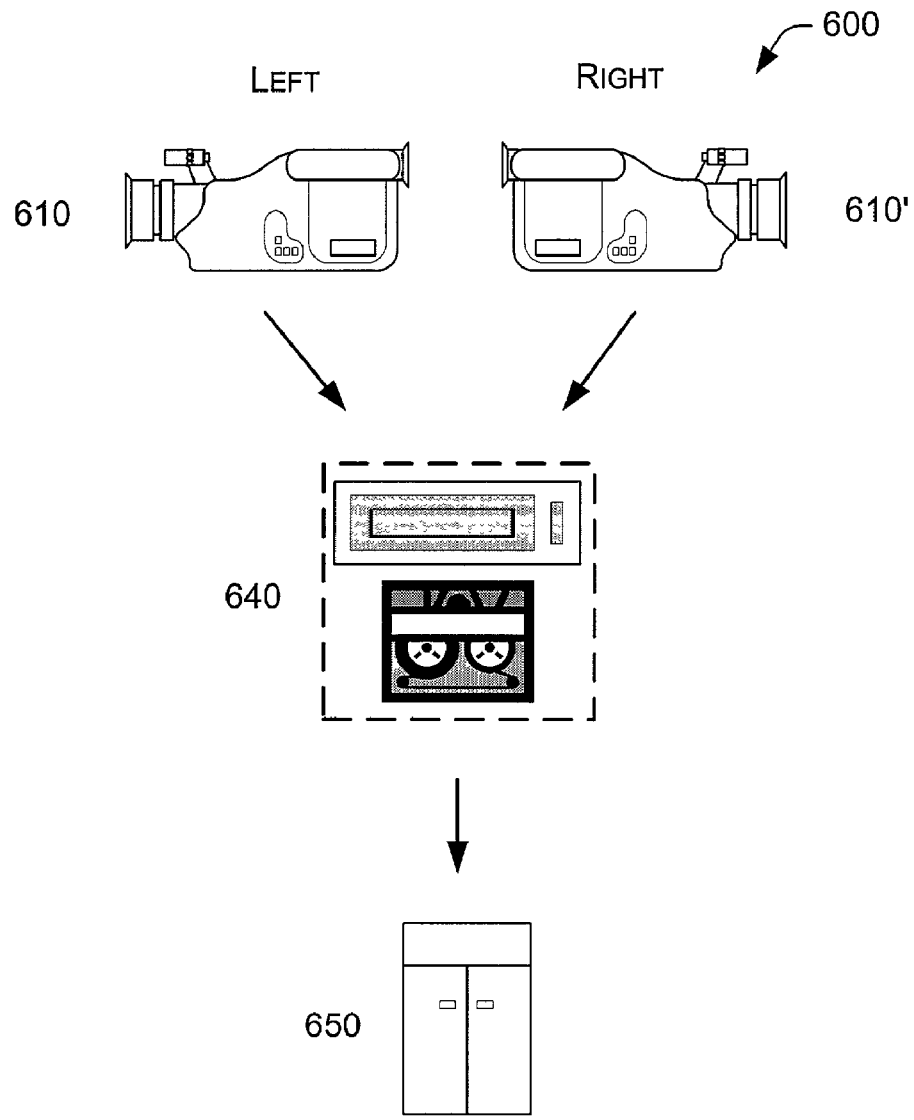
FIG. 6 is a block diagram illustrating an exemplary electronic camera or digital camera method for producing stereoscopic video data.

FIGS. 5 and 6 show block diagrams of exemplary methods 500, 600 for producing stereoscopic video. Of course, audio may also accompany the video throughout the exemplary methods 500, 600. Referring to FIG. 5, in a left image shooting block 510 and a right image shooting block 510', images are acquired, for example, on photographic film. Next, in at least one film transfer block (e.g., left film transfer block 520 and right film transfer block 520'), film is transferred to a telecine or other suitable analog-to-digital conversion device. In an analog-to-digital conversion block 530, the left and right images from the film are converted to digital data. The analog-to-digital conversion block 530 then outputs a digital data stream to a recorder and/or other suitable device. In a conversion, storage and/or transmission block 540, the digital data are converted, stored and/or transmitted by a computer, recorder and/or analyzer (e.g., switcher/multiplexer). A conversion to particular format block 550 optionally follows wherein the digital data (converted, stored, and/or transmitted via the functional block 540) are converted to at least one file and/or stream.

For stereoscopic images, formatting of left and right images optionally occurs at any of a variety of points. For example, formatting may occur in the analog-to-digital conversion block 530 wherein a telecine alternately converts a left image from a left film and a right image from a right film to digital images. Such a telecine may have a reel(s) and/or other means for carrying a left film and a right film. In another example, formatting occurs in the conversion, storage and/or transmission block 540. In this example, a computer, a recorder and/or an analyzer receive digital data from the analog-to-digital conversion block 530 for a left image and a right image. The computer, recorder and/or analyzer then format the digital data in a stereoscopic format, such as, but not limited to, a left channel and a right channel format or an alternating left data and right data format. In yet another example, formatting occurs in the conversion to a particular format block 550. In this example, a computer receives left image data and right image data. Next, the computer converts left image data to a left file and/or stream and converts right image data to a right file and/or stream. Alternatively, the computer converts the left image data and the right image data to a single file and/or stream. In this alternative example, the right image data and the left image data are optionally interleaved and/or formatted in a side-by-side or above-below format. In general, as described above, the conversion to a particular format involves use of a codec or compression algorithm. In one exemplary method, the particular format is a WINDOWS MEDIA™ format, such as, but not limited to, an advanced systems format. Of course, other formats may be suitable.

Referring to FIG. 6, an exemplary method for producing stereoscopic video 600 is shown. In a left image shooting block 610 and a right image shooting block 610', images are acquired using, for example, an electronic stereo camera and/or two electronic cameras wherein the stereo camera and/or cameras output data via analog and/or digital signals to a recording/storage medium and/or an external device (see, e.g., the aforementioned SONY® digital cameras). The exemplary method 600 optionally uses a genlock device to lock or synchronize left and right image data and/or signals. In a conversion, storage and/or transmission block 640, the data are converted, stored and/or transmitted by a computer, recorder and/or analyzer (including, e.g., a switcher or a multiplexer). A conversion to a particular format block 650 optionally follows wherein the digital data (converted, stored, and/or transmitted via the functional block 640) are converted to at least one file and/or stream.

For stereoscopic images, formatting of left and right images optionally occurs at any of a variety of points. For example, formatting may occur in the conversion, storage and/or transmission block 640. In this example, a computer, a recorder and/or an analyzer receive analog and/or digital data from the shooting blocks 610, 610' for a left image and a right image. The computer, recorder and/or analyzer then format the data in a stereoscopic format, such as, but not limited to, a left channel and a right channel format or an alternating left data and right data format. In yet another example, formatting occurs in the conversion to a particular format block 650. In this example, a computer receives left image data and right image data. Next, the computer converts left image data to a left file and/or stream and converts right image data to a right file and/or stream. Alternatively, the computer converts the left image data and the right image data to a single file and/or stream. In this alternative example, the right image data and the left image data are optionally interleaved and/or formatted in a side-by-side or above-below format. In general, as described above, the conversion to a particular format involves use of a codec or compression algorithm. In one exemplary method, the particular format is a WINDOWS MEDIA™ format, such as, but not limited to, an advanced systems format. Of course, other formats may be suitable.

Figure 7:
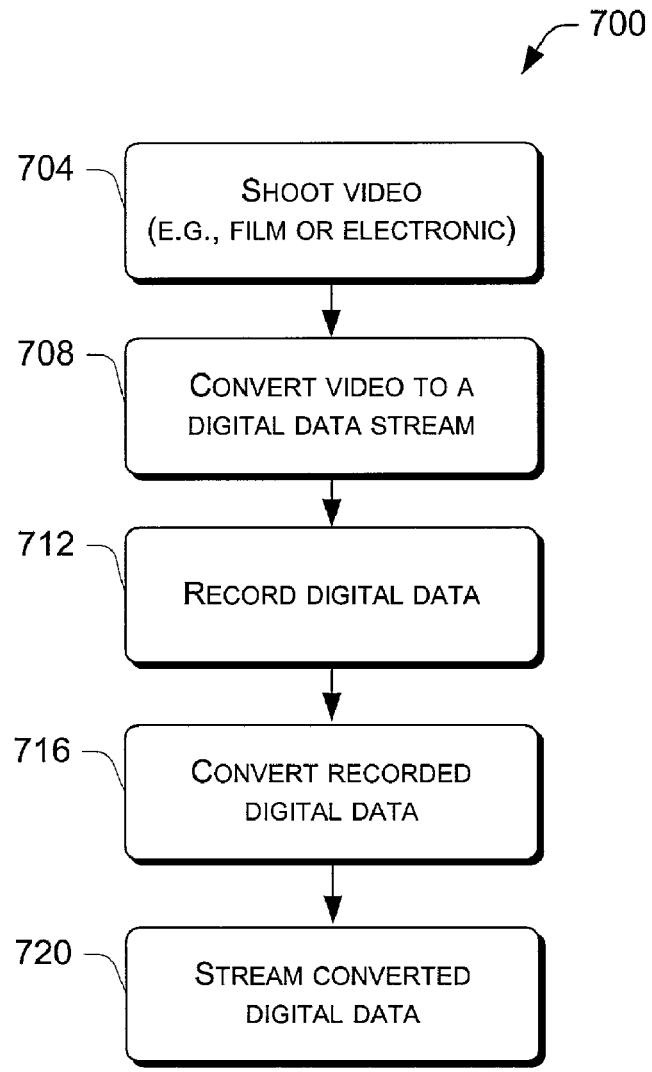
FIG. 7 is a block diagram illustrating an exemplary method for producing a stream and/or file.

FIG. 7 shows a block diagram of an exemplary method 700 for producing a bit stream. In this exemplary method 700, the resulting bit stream has a format suitable for use in a stereoscopic display scheme. According to the method 700, in a shoot block 704, video is acquired via film and/or electronic means. Of course, the video may also have an audio track recorded on film and/or on another medium. Next, in a conversion block 708, the video is converted to a digital data stream, which optionally includes audio data. Of course, if a digital electronic camera(s) is used, then this conversion may not be necessary. The digital data stream of the conversion block 708 optionally complies with the SMPTE 292M specification or SMPTE 259M specification. The digital data stream may have, for example, a 1920 pixel by 1080 line resolution format and a frame rate of approximately 24 fps. The digital data stream optionally includes a left image and a right image (e.g., side-by-side or above-below), alternating left and right images, right images only and/or left images only. The digital data stream is optionally recorded by a recorder onto a suitable recording medium in a record block 712. The digital video data are optionally recorded on a frame-by-frame or other suitable basis.

In the record block 712, the video may retain its original pixel by line format and/or frame rate. Alternatively, the pixel by line format and/or the frame rate are converted to a format and/or frame rate suitable for use with a stereoscopic display scheme. In addition, the video data may be scaled and/or frames omitted; of course, these and/or other operations may be performed in the conversion block 708. Following the record block 712, in yet another conversion block 716, the digital data are converted to a format suitable for streaming and/or storage. The conversion block 716 optionally compresses the digital data, for example, using a compression algorithm. For example, the conversion block 716 optionally compresses the recorded digital data using WINDOWS MEDIA™ software that includes a video and/or audio codec. In addition, the conversion block 716 typically converts the recorded digital data to a particular format. Suitable formats include, but are not limited to, WINDOWS MEDIA™ formats (e.g., advanced systems format).

The conversion block 716 may also scale the image size prior to, during and/or after any conversion. For example, the exemplary method 700 optionally records digital video data having a resolution of 1920 pixel by 1080 line and then scales this data to a resolution of 1280 pixel by 720 line. After scaling, the conversion block 716, as mentioned, optionally compresses the data wherein the compressed data has a particular format. In this example, the particular format is suitable for streaming the data, for example, but not limited to, with a bandwidth of approximately 1.5 Mbps, 3 Mbps, 6 Mbps, 10 Mbps, etc. Note that according to aspects of other exemplary methods described herein, conversion to a particular format does not necessarily involve compression, for example, consider conversion from an uncompressed QUICKTIME® format to an uncompressed WINDOWS MEDIA™ format. Such a conversion is optionally based on a conversion of header information. Of course, the resolution, frame rate, color format, and/or stream rate may depend on the stereoscopic display scheme. For example, one particular stereoscopic display scheme, described below, optionally uses right and left images wherein each image has an approximately 853 pixel by approximately 486 line format (e.g., approximately 400,000 pixels).

Figure 8:
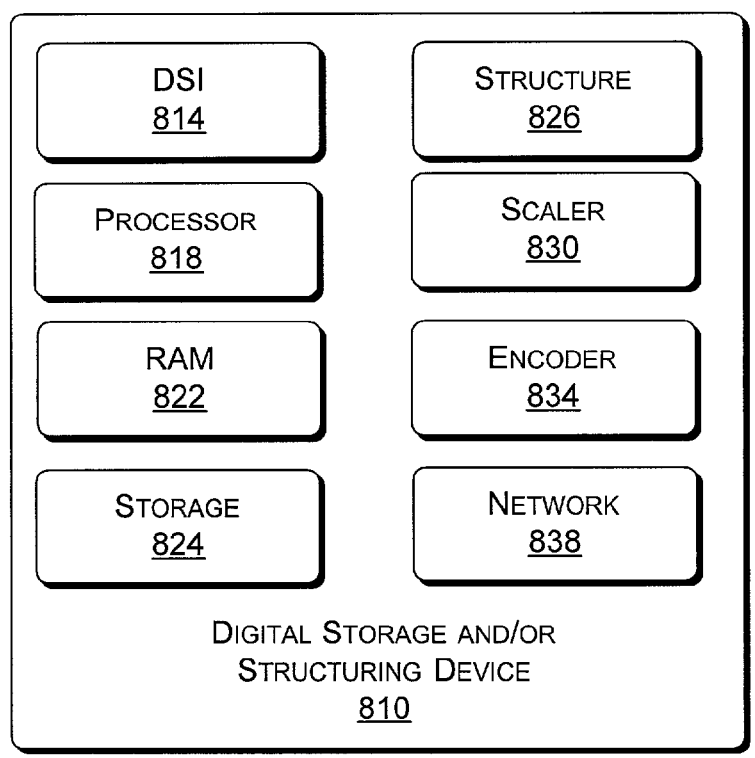
FIG. 8 is a block diagram illustrating an exemplary device and/or system for digital storage and/or structuring.

Referring to FIG. 8, a digital storage and/or structuring device 810 is shown. While FIG. 8 shows functional blocks in a device, various functional blocks optionally appear as a system wherein more than one computer (e.g., computing device) is used. This particular device 810, and/or features thereof, is suitable for use with various exemplary methods described herein. For example, the device 810 is suitable for use in the exemplary method 500 of FIG. 5 for performing some or all tasks of blocks 540 and/or 550; and in the exemplary method 600 of FIG. 6 for performing some or all tasks of blocks 640 and 650. In particular, use of the device 810 may simplify tasks and/or alleviate tasks of the exemplary method 700 of FIG. 7.

The digital storage and/or structuring device 810 optionally includes some or all features of the aforementioned devices of Àccom, Inc. and/or Post Impressions, Inc. The device 810 may also include some or all features of other hardware and/or software described herein. Thus, the digital storage and/or structuring device 810 is optionally capable of recording video data from a telecine and/or other analog-to-digital conversion device (e.g., a digital camera). The digital storage and/or structuring device is also optionally capable of receiving digital video data from other sources (e.g., a recorder/player). As shown in FIG. 8, this device 810 includes a variety of functional hardware and/or software blocks, some of which may be optional. The blocks include a digital serial interface (DSI) block 814 for receiving and/or sending video data via a digital serial interface. The DSI block 814 may receive and/or send digital video data transmitted according to an SMPTE standard and/or other standards. A processor block 818 performs various computational tasks typically related to other functional blocks. A RAM block 822 optionally stores video data prior to storage in a storage block 824. A structure block 826 optionally structures video data from the RAM block 810 or from another block prior to storage in the storage block 824. For example, the device 810 may receive video data via the DSI block 814, transmit the data to the RAM block 822 for storage in RAM and then structure the video data in the structure block 826 to allow for more efficient storage of the video data in the storage block 826. Accordingly, the structure block 826 may structure the data according to a format, typically suitable for storage. Such formats include, but are not limited to, a WINDOWS MEDIA™ format. In this particular example, the data is optionally in an "uncompressed" form, in that, it has not been compression encoded. In one particular example, the structure block 826 structures video data in a particular format and stores the structured data to a disk or disks. Structuring may also include structuring of format information (e.g., contained in a file header) to other information associated with another format. Such structuring may effectively produce a WINDOWS MEDIA™ format file and/or stream suitable for encoding by a WINDOWS MEDIA™ encoder (e.g., compression encoding). In addition, structuring may include structuring in a stereoscopic format, i.e., a format suitable for use with a stereoscopic display scheme. Further, structuring may also include encoding, e.g., to thereby produce a file and/or a stream suitable for decompression or decoding.

A scaler block 830 optionally scales video data prior to and/or after storage of video data. The scaler block 830 optionally scales video resolution (e.g., pixel and/or line) and/or frame rate (e.g., drops frames). In addition, the scaler block 830 may also scale and/or alter color information, potentially according to a color space specification and/or sampling format (e.g., reducing bit depth). The scaler block 830 optionally comprises scaling software. Such software is optionally ADOBE® PREMIER® software (Adobe Systems, Inc., San Jose, Calif.). The ADOBE® PREMIER® software can edit digital video data in a variety formats, including QUICKTIME® format, WINDOWS MEDIA™ format, and AVI format. In an exemplary system, a scaler block resides on a separate computer that optionally accepts video data from a device such as the device 810 shown in FIG. 8. Such a system may also be capable of transmitting scaled video data, whether encoded or unencoded, in a variety of formats. The device 810 may also scale data to conform to a suitable stereoscopic display scheme.

The device 810 optionally includes an encode block 834 that can encode video data. For example, the encode block 834 can encodes video data stored in the storage block 824. The encode block 834 optionally includes software components for encoding. For example, the encode block 834 optionally includes WINDOWS MEDIA™ technology components that operate on a WINDOWS® OS or other OS. According to an exemplary system, the encoder block 834 is optionally executed on a separate computer in communication with the device 810 wherein the separate computer optionally includes storage and/or a communication interface. The encoded video data is then optionally stored in the storage block 824 and/or transmitted via a network block 838. For example, referring to FIGS. 5 and 6, the device 810 optionally operates as blocks 540 or 640 wherein structuring to a format occurs and encoding occurs in subsequent blocks 550 or 650. Alternatively, structuring and encoding occur in blocks 540 or 640 using a device such as the device 810. As mentioned, the encode block 834 is optionally included in the structure block 826; thus, structuring optionally includes encoding. While the description largely pertains to video, it is understood that often audio data will accompany the video data and that the WINDOWS MEDIA™ format and/or other formats (e.g., QUICKTIME® format, etc.) can be used for, and may include, both video and audio data.

Figure 9:
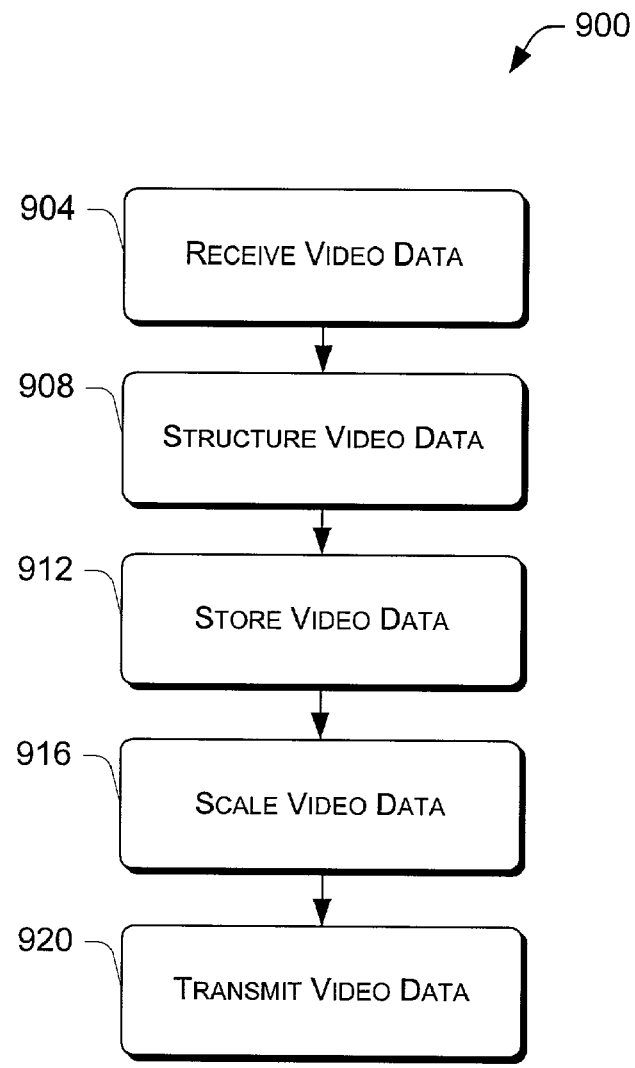
FIG. 9 is a block diagram illustrating an exemplary method for processing video data.

FIG. 9 shows a block diagram illustrating an exemplary method for structuring and storing video data 900. In a reception block 904, a device (e.g., the device 810 of FIG. 8) receives digital video data via a digital serial interface. Next, in a structuring block 908, the device structures the digital video data in a manner that facilitates storage of the video data onto a storage medium (e.g., in a storage block 712). For example, the device may structure the video data to facilitate storage of the data onto a disk or a disk array. As mentioned previously, such structuring optionally includes structuring to a WINDOWS MEDIA™ format. In addition, structuring may include structuring to a stereoscopic format. Once the video data is stored onto a storage medium, then, in a scale block 916, the device optionally scales the data in manner that may facilitates distribution and/or playback of the video data (e.g., facilitates stereoscopic distribution and/or playback). Finally, the scaled data is transmitted via a network or other transmission means to a downstream client or clients. For example, the device may receive 1920 pixel by 1080 line resolution video at a rate of approximately 1.5 Gbps, structure and store this data in or near real-time, scale the data to fit a particular downstream client and then transmit the data to the downstream client. The device may optionally save scaled data and then transmit the already saved scaled data and/or scale data on the fly or as demanded.

Figure 10:
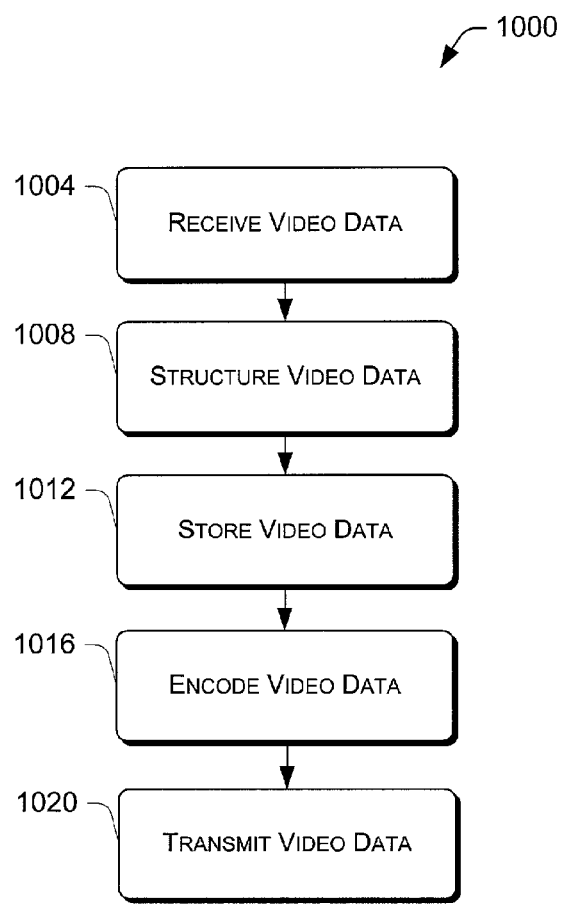
FIG. 10 is a block diagram illustrating an exemplary method for processing video data.

A block diagram of another exemplary method for storing and/or structuring data 1000 is shown in FIG. 10. In a reception block 1004, a device (e.g., the device 810 of FIG. 8) receives digital video data via a digital serial interface. Next, in a structuring block 1008, the device structures the digital video data in a manner that facilitates storage of the video data onto a storage medium (e.g., in a storage block 1012). For example, the device may structure the video data to facilitate storage of the data onto a disk or a disk array. As mentioned previously, such structuring optionally includes structuring to a WINDOWS MEDIA™ format. In addition, the structuring may include structuring to a stereoscopic format. Once the video data is stored onto a storage medium, then, in an encode block 1016, the device optionally encodes the data in manner that may facilitate distribution and/or playback of the video data. Finally, the encoded data is transmitted via a network to a downstream client or clients. For example, the device may receive 1920 pixel by 1080 line resolution video at a rate of approximately 1.5 Gbps, structure and store this data in or near real-time, encode the data to fit a particular downstream client and then transmit the data to the downstream client. The device may optionally save encoded data and then transmit the already saved encoded data and/or encode data on the fly or as demanded. Encoded data is optionally transmitted as a complete file or as a data stream. In a particular example, the encoded data is in a WINDOWS MEDIA™ format. The exemplary method may produce a single left video file and/or stream, a single right video file and/or stream, an interlaced left and right video file and/or stream and/or a variety of other files and/or streams for use in a stereoscopic display scheme.

An exemplary method that makes use of features of the device 810 and of the exemplary methods 900 and 1000 receives digital video data having a resolution of approximately 1920 pixel by approximately 1080 lines. Next, the data is structured in a format suitable for storage. Once stored, a computer having scaling software accesses the stored data and scales the resolution to approximately 1280 pixel by approximately 720 lines. Of course, scaling to other resolutions is also possible, e.g., 853 pixel by 486 line, 352 pixel by 480 line, etc. After scaling, a software block, optionally operating on the same computer as the scaling software, structures the data into another format and then encodes the data. For example, the computer optionally structures the data in a WINDOWS MEDIA™ format and encodes the data using a WINDOWS MEDIA™ codec.

In the exemplary methods, devices and/or systems referred to in FIGS. 8-10, a device (e.g., the device 810 of FIG. 8) optionally transmits stored video data to a CD recorder and/or a DVD recorder. The CD and/or DVD recorder then records the data, which is optionally encoded or compressed and/or scaled to facilitate playback on a CD and/or DVD player. DVD players can typically play data at a rate of 10 Mbps; however, future players can be expected to play data at higher rates, e.g., perhaps 500 Mbps. In this particular example, the device scales the video data according to a DVD player specification (e.g., according to a data rate) and transmits the scaled data to a DVD recorder. The resulting DVD is then playable on a DVD player having the player specification. According to such a method, encoding or compression is not necessarily required in that scaling achieves a suitable reduction in data rate. In general, scaling is a process that does not rely on a process akin to compression/decompression (or encoding/decoding) in that information lost during scaling is not generally expected to be revived downstream. Where encoding or compression is used, a suitable compression ratio is used to fit the content onto a DVD disk. The CD and/or DVD recorder and/or player optionally support a stereoscopic display scheme. In perhaps the simplest case, the CD and/or DVD player plays stereoscopic video according to a WLC stereoscopic display scheme. In other instances, the CD and/or DVD player supply a signal for an eyewear shutter.

Regarding storage to a transportable storage medium, such as, but not limited to, a DVD disk, consider content having a 1280 pixel by 720 line resolution, a frame rate of 24 fps and a color depth of 24 bits. Such content requires a bit rate of approximately 530 Mbps and two hours of content requires a file size of approximately 3.8 Tb. For stereoscopic video using a stereoscopic display scheme that relies on left eye video and right eye video, the requirements would typically be double: an overall bit rate of approximately 1.6 Gbps and an overall file(s) size of approximately 7.6 Tb. A compression ratio of approximately 200:1 would reduce the overall file(s) size to approximately 38 Gb, which would fit on a single sided DVD disk. In addition, the overall bit rate would be approximately 8 Mbps. Consider another example with content having a 853 pixel by 486 line resolution, a frame rate of 24 fps and a color depth of 24 bits. For two hours of stereoscopic video using a stereoscopic display scheme that relies on left eye video and right eye video, an overall bit rate of approximately 480 Mbps and an overall file(s) size of approximately 3.4 Tb results. A compression ratio of approximately 100:1 would reduce the overall file(s) size to approximately 38 Gb, which would fit on a single sided DVD disk. In addition, the overall bit rate would be approximately 5 Mbps. Subjective and objective quality measures of such content are discussed in more detail below.

Figure 11:
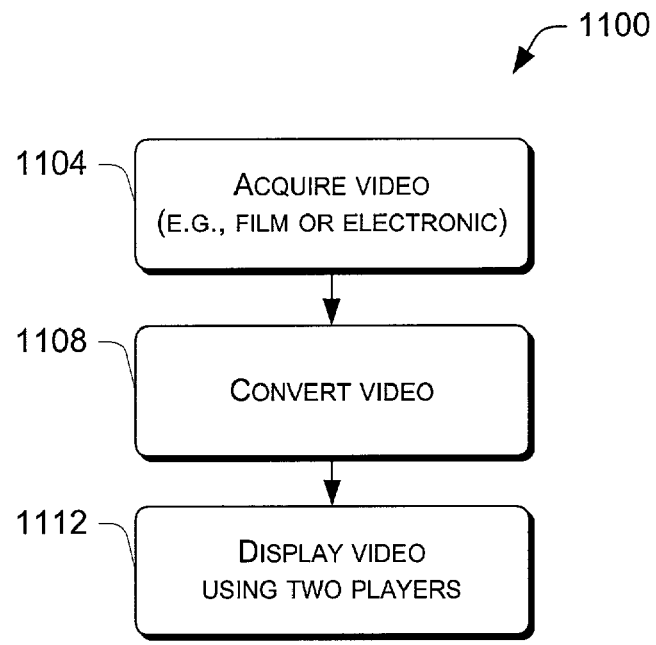
FIG. 11 is a block diagram illustrating an exemplary method for displaying stereoscopic video using two players.

Referring to FIG. 11, an exemplary method 1100 for displaying stereoscopic images is shown. In an acquisition block 1104, stereoscopic image data are acquired from a source, such as, but not limited to, a telecine, a camera, a computer, an animator, etc. Next, in a conversion block 1108, the stereoscopic image data are converted to a particular format (e.g., using the device 810 of FIG. 8). Following the conversion, in a display block 1112, a computer displays the stereoscopic images using a stereoscopic display scheme. For example, in the display block 1112, the computer optionally executes software to operate at least one player capable of decoding and displaying images supplied in the particular format. In this example, the computer optionally executes software to operate two players wherein one player displays left images and the other player displays right images. Further, the two players are operated in a coordinated manner to allow each player to, for example, display to the same display space and/or a different display space. For example, both players optionally display images to a 853 pixel by 486 line display space. Alternatively, for example, the players display images to side-by-side display spaces and/or different display devices. As previously mentioned, the left and right images optionally have an 853 pixel by 486 line format. For stereoscopic display schemes using eyewear, the left image display and/or the right image display are coordinated with the eyewear to enable 3D viewing. Such coordination is optionally achieved by providing a signal for eyewear associated with a stereoscopic display scheme. For example, a WLC may simply provide a "white line code", or other suitable code, on a display. Other exemplary systems and/or method optionally provide an electromagnetic signal that is sensed by eyewear and/or equipment associated with eyewear. Further, a computer for the aforementioned exemplary methods optionally includes dual video display capabilities to display images using two or more display devices. Such capabilities may also be combined with a multiplexer to display a left image and a right image using one display device.

Figure 12:
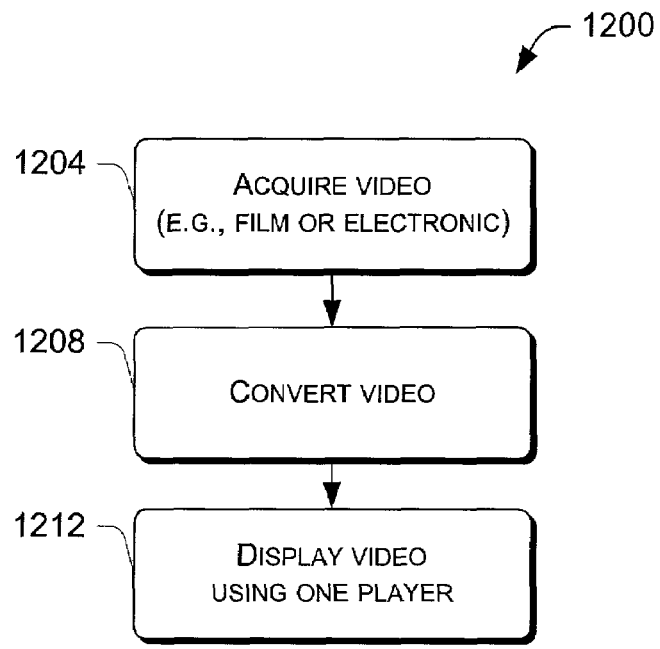
FIG. 12 is a block diagram illustrating an exemplary method for displaying stereoscopic video using one player.

Another exemplary method for displaying stereoscopic images 1200 is shown in FIG. 12. In an acquisition block 1204, stereoscopic image data are acquired from a source, such as, but not limited to, a telecine, a camera, a computer, an animator, etc. Next, in a conversion block 1208, the stereoscopic image data are converted to a particular format (e.g., using the device 810 of FIG. 8). Following the conversion, in a display block 1212, a computer displays the stereoscopic images using a stereoscopic display scheme. For example, in the display block 1212, the computer optionally executes software to operate a player capable of decoding and displaying images supplied in the particular format. In this example, the computer optionally executes software to operate a player wherein the player displays alternately a left image and a right image. For stereoscopic display schemes using eyewear, display of the left image and/or the right image is coordinated with the eyewear to enable 3D viewing. In this example, the computer and the display device optionally have a high refresh rate, for example, 96 Hz and above. In general, such a refresh rate is suitable for displaying video having a frame rate of 48 fps (e.g., stereoscopic video wherein each eye has a frame rate of 24 fps).

In various exemplary methods, image data are optionally scaled to account for processing power of downstream destinations, e.g., clients, and/or the type of stereoscopic display scheme used. For example, a 900 MHz PENTIUM® III processor (Intel Corporation, Delaware) in a computer with appropriate buss architecture and a VGA output card can produce consistent play of a 0.75 Mbps stream having an 853 pixel by 486 pixel image format, a frame rate of 24 fps, and a bit depth of approximately 24 (e.g., "true color"). Dual 1.1 Ghz PENTIUM® III processors in a computer or a single 1.4 GHz AMD® processor (Advanced Micro Devices, Incorporated, Delaware) in a computer can consistently be used to decode and play of a stream having a 1280 pixel by 720 line format, a frame rate of 24 fps and a bit depth of approximately 24 (e.g., "true color") while dual 1.4 GHz AMD® processors in a computer can be used to decode and play a stream having a 1920 pixel by 1080 line image format, a frame rate of 24 fps and a bit depth of approximately 24 (e.g., "true color"). Of course, other arrangements are possible, including single processor computers having processor speeds in excess of 1 GHz (also see the graph of FIG. 13 and the accompanying description). Of course, adjustments are possible to account for stereoscopic video, particularly, the characteristics of the stereoscopic video and/or the stereoscopic display scheme.

Figure 13:
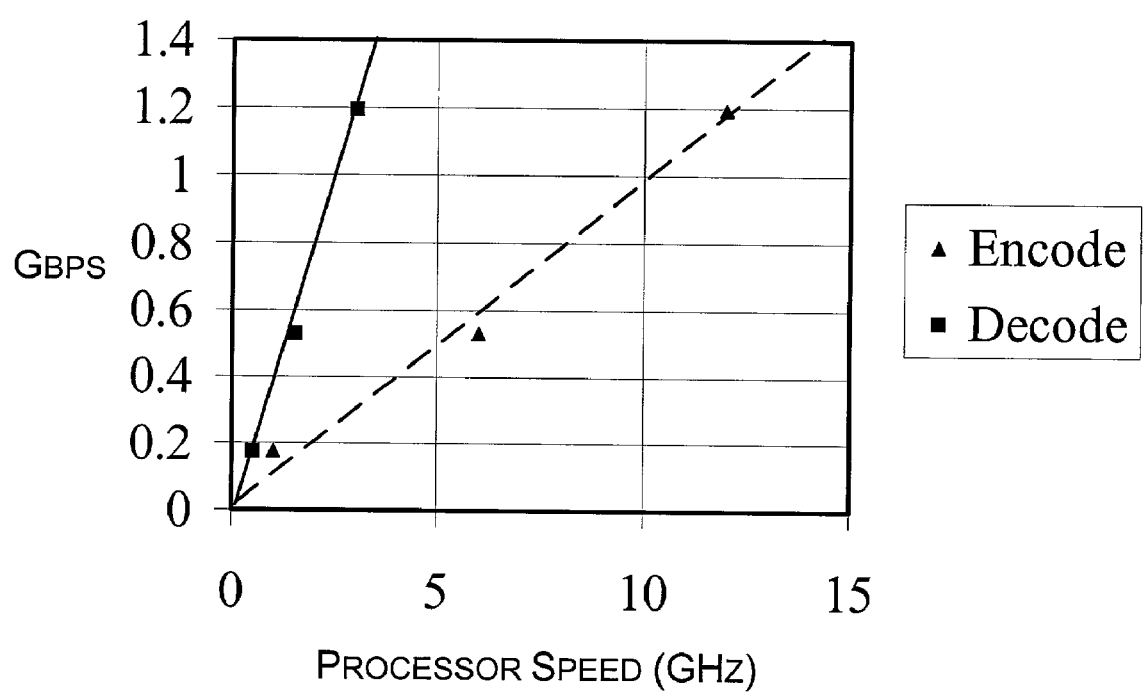
FIG. 13 is a graph of video data rate in Gbps versus processor speed in GHz for a computer having a single processor.

FIG. 13 is a graph of bit rate in Gbps (ordinate, y-axis) versus processor speed for a computer having a single processor (abscissa, x-axis). The graph shows data for encoding video and for decoding video. Note that the data points lay along approximately straight lines in the x-y plane (a solid line is shown for decoding and a dashed line is shown for encoding). A regression analysis shows that decoding has a slope of approximately 0.4 Gbps per GHz processor speed and that encoding has a slope of approximately 0.1 Gbps per GHz processor speed. In this particular graph, it is apparent that, with reference to the foregoing discussion, that resolution, frame rate and color space need not adhere to any specific format and/or specification. The ordinate data was calculated by multiplying a pixel resolution number by a line resolution number to arrive at the number of pixels per frame and then multiplying the pixels per frame number by a frame rate and the number of color information bits per pixel. Thus, according to various exemplary methods, devices and/or systems described herein, encoding and/or decoding performance characteristics, if plotted in a similar manner would produce data lying approximately along the respective lines as shown in FIG. 13. Thus, according to various aspects of exemplary methods, devices and/or systems described herein, a computer having an approximately 1.5 GHz processor has can decode encoded video at a rate of approximately 0.6 Gbps, e.g., 1.5 GHz multiplied by 0.4 Gbps/GHz, and therefore, handle video having a display rate of approximately 0.5 Gbps, e.g., video having a resolution of 1280 pixel by 720 line, a frame rate of 24 frames per second and a color bit depth of 24 bits. Note that for decoding, the rate is given based on a video display format and not on the rate of data into the decoder. The performance for stereoscopic video may depend on the type of method used. For example, encoding and/or decoding of a stream or a file containing alternating right and left image data may have rates that exceed 0.1 Gbps/GHz (encoding) and/or 0.4 Gbps/GHz (decoding) due to similarities between right image and left image. Possible enhancements due to similarities between right image and left image are discussed below.

Figure 14:
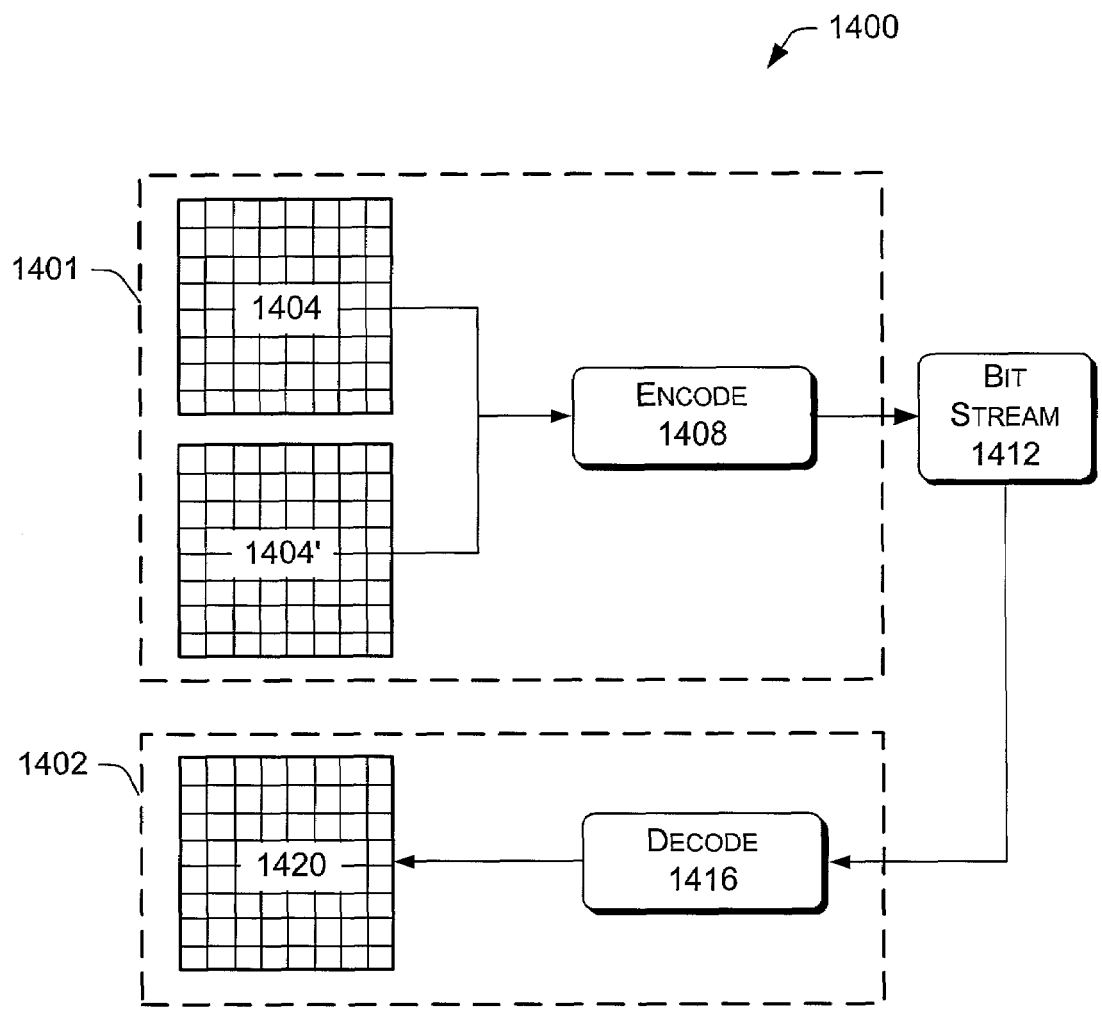
FIG. 14 is a block diagram illustrating an exemplary method for encoding and decoding stereoscopic video data.

The various exemplary methods described herein typically compress (or encode) and/or decompress (or decode) video data. As shown in FIG. 4, image data 404 is compressed (or encoded) in an encoding block 408, transmitted as a bit stream 412 and/or as a file, and decompressed (or decoded) in a decoding block 416. Another exemplary compression/decompression method 1400 is shown in FIG. 14. This method optionally uses two computers, an encoding computer 1401 and a decoding computer 1402. As shown, the encoding computer 1401 receives left image data 1404 and right image data 1404'. The encoding computer 1401 encodes the left image data 1404 and the right image data 1404' in an encoding block 1408. In general, simultaneously acquired stereoscopic left and right images are quite similar, especially when one considers that the human eyes have an interaxial separation of approximately 6 cm. Thus, a compression algorithm may compress a right image on the basis of a left image or vice versa. As a result, the size of a compressed left and right stereoscopic image pair is less than the size of two independent monoscopic images. As a consequence, display of stereoscopic video does not necessarily require twice the bandwidth, memory and/or processing power as display of monoscopic video. Referring again to FIG. 14, an encode block 1408 alternately compresses (or encodes) left image data 1404 and right image data 1404'. Further, in this exemplary method 1400, the encode block 1408 does not necessarily differ from an encode block for compressing (or encoding) monoscopic images. Again, post-processing an inter- or intra-frame information may also be used in compression and/or decompression.

After the encode block 1408, the stereoscopic image data are stored and/or transmitted. As shown in FIG. 14, the stereoscopic image data are streamed in a stream block 1412 from the encoding computer 1401 to the decoding computer 1402 using a constant bit rate and/or a variable bit rate. The decoding computer 1402 includes a decode block 1416 for decompressing (or decoding) the stereoscopic image data. The decoding computer 1402 also includes a display device or display device memory (e.g., a framebuffer) 1420. The decoding computer 1402 transmits stereoscopic image data decompressed by the decode block 1416 to the display device or display device memory 1420 to generate a 3D display using a suitable stereoscopic display scheme.

Suitable stereoscopic display schemes for use with the exemplary method 1400 include, but are not limited to, full-screen, WLC, and/or quad-buffered display schemes. In particular, one exemplary stereoscopic display scheme alternately displays a left eye image and a right eye image and simply synchronizes eyewear with display of the left eye image and the right eye image. According to this exemplary scheme, the decoding computer 1402 executes a player that transmits a sync signal to eyewear (which optionally includes a device associated with goggles, etc.). Alternatively, the signal may be triggered by a framebuffer or another component of the encoding computer 1402 and associated display device.

Figure 15:
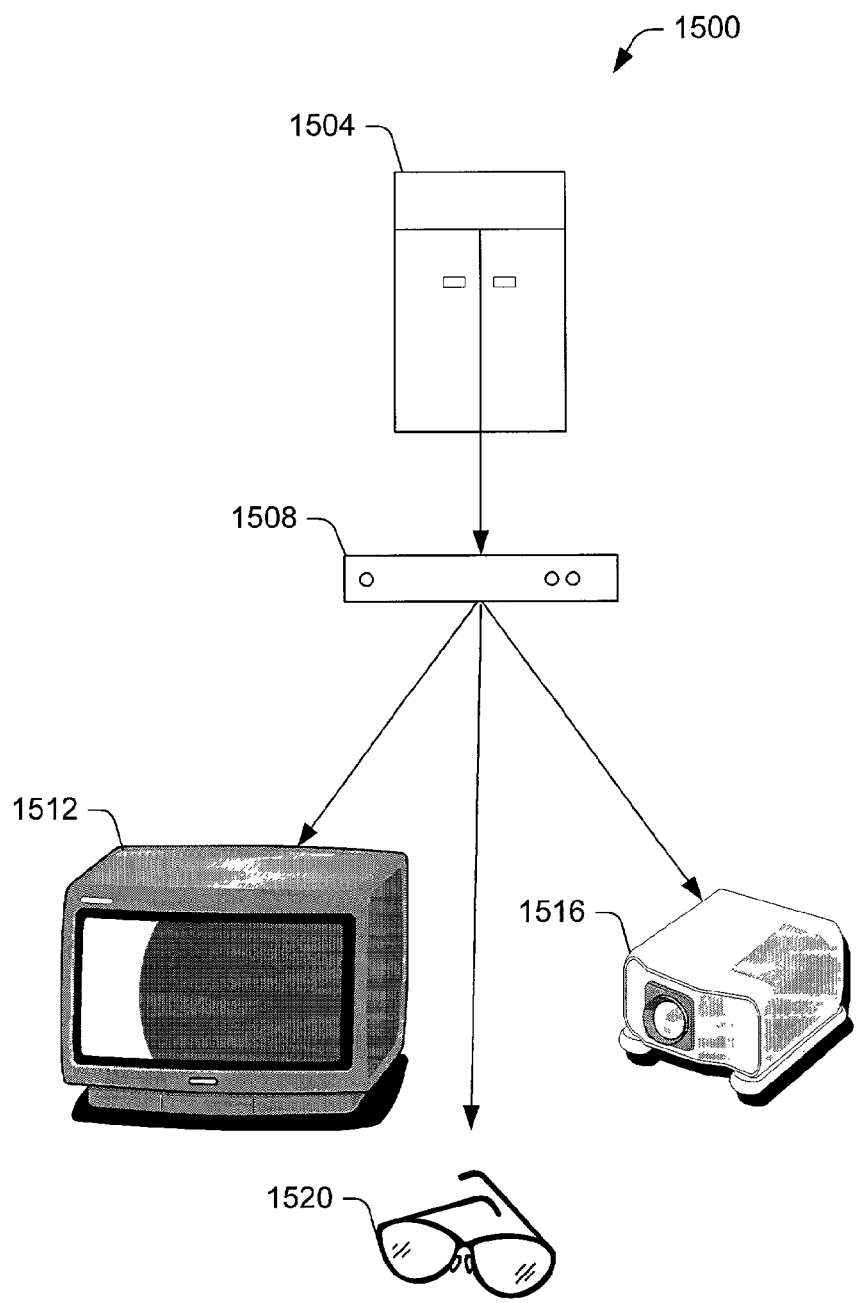
FIG. 15 is a block diagram illustrating an exemplary method for displaying stereoscopic video and/or audio data from an I/O device.

In general, once a stream and/or file are delivered, a computer having appropriate decompression (or decoding) software (e.g., WINDOWS MEDIA™ technology software, etc.) may play the video and/or audio information encoded in the stream and/or file. For example, FIG. 15 shows a diagram of an exemplary method 1500 for playing video and/or audio information delivered in an encoded format. According to this exemplary method 1500, a computer 1504 having decompression software (e.g., WINDOWS MEDIA™ software, etc.) receives digital data in an encoded format (e.g., WINDOWS MEDIA™ format, etc.) as a stream and/or as file. The digital data optionally includes video data having an image and/or frame rate format selected from the common video formats listed in Table 2, for example, the digital data optionally has a 1280 pixel by 720 line image format. Other video resolution formats are possible as well, for example, but not limited to, 1280 pixel by 1024 line, 1024 pixel by 768 line, 853 pixel by 486 line, 352 pixel by 480 line etc. Of course, the data may have a different image format and/or frame rate. In general, the image format and frame rate are suitable for use in a stereoscopic display scheme.

In an exemplary method, a left eye video file and/or stream and a right eye video file and/or stream are launched simultaneously and locked together using two players. The players optionally direct the decoded data to individual outputs of a dual video display card (e.g., a dual VGA card, etc.). A multiplexer is optionally used to multiplex the left eye video and the right eye video output of the display card to a single monitor. The method further optionally provides a signal for eyewear. Such a signal is optionally in sync with the players, the display card, the multiplexer and/or another part of the stereoscopic display system to allow for stereoscopic display of the left eye video and right eye video.

Yet another exemplary method uses a single player that can handle two streams and/or two files, wherein each stream and/or file includes either left eye video or right eye video. This exemplary method displays left and right eye video sequentially, for example, on a monitor with a refresh rate that is approximately at least twice the sum of the frame rates. For example, if the left eye and the right eye video have a frame rate of 24 fps, then a monitor having a refresh rate of approximately 96 Hz is optionally used. Of course, an even higher refresh rate would produce an even higher quality result. For example, a monitor with a refresh rate of approximately at least 120 Hz is optionally used. Further, this exemplary method optionally uses a DIRECTSHOW® application or a DIRECTX® SDK (Microsoft, Inc., Redmond, Wash.).

As shown in FIG. 15, data are received by the computer 1504. For example, the aforementioned digital data (resolution of 1280 pixel by 720 line) are received by a computer (e.g., the computer 1504) having a PENTIUM® processor (Intel Corporation, Delaware) having a speed of 1.4 GHz (e.g., a PENTIUM® III processor). Consider another example wherein the digital data optionally has a 1920 pixel by 1080 line image format and a frame rate of 24 fps. The data are received by a computer (e.g., the computer 1504) having two processors, wherein each processor has a speed of greater than 1.2 GHz, e.g., two AMD® processors (Advanced Micro Devices, Incorporated, Delaware). In general, a faster processor speed allows for a higher resolution image format and/or a higher frame rate. Of course, adjustments are possible for stereoscopic video. For example, the resolution is optionally adjusted to a target number of pixels (or less) based on processing speed and/or a need to have an effective frame rate double that of each individual left eye video or right eye video.

The graph of FIG. 13 is at times useful in determining and/or estimating a target number of pixels per second for stereoscopic video. For example, given an approximately 2 GHz processor, according to the graph of FIG. 13, a decode bit rate of approximately 0.5 Gbps is possible. Now consider a frame rate of 24 fps and a requirement for corresponding stereoscopic video of approximately 48 fps; dividing 0.5 Gbps by 48 fps yields approximately 10 Mb. Now consider a color depth of 16 bits per pixel; dividing 10 Mb by 16 bits per pixel yields approximately 650,000 pixels, which corresponds to a square image of approximately 800 pixel by 800 lines. Thus, a computer having an approximately 2 GHz processor can provide a stereoscopic display with a resolution of 800 pixel by 800 lines (or essentially any possible combination of pixel and line that equates with 650,000 pixels or less). In addition, 2 hours of such stereoscopic content (approximately 3.5 Tb) fits on a single sided DVD disk with a compression ratio of approximately 100:1. The bit rate for 35 Gb of such stereoscopic content is approximately 5 Mbps. Of course, with a higher compression ratio, the file size and the bit rate are optionally reduced. For example, a 500:1 compression ratio decreases the bit rate to approximately 1 Mbps.

Referring again to FIG. 15, after the computer 1504 has received the data, the data are transmitted to an input/output device 1508 capable of outputting data in a particular format. For example, one such I/O device is the FILMSTORE™ (Avica Technology Corporation, Santa Monica, Calif.) I/O device, which can output data according to the SMPTE 292M specification. The FILMSTORE™ I/O device is compression and encryption independent and has a DVD-ROM drive, six channel (5.1) digital audio output, and up to 15 TB of storage. The FILMSTORE™ I/O device stand-alone playback capability and, in a server configuration, can accommodate single or multi-screen playing, optionally with continuously changing storage, scheduling and distribution requirements. Suitable inputs to the FILMSTORE™ I/O device include, but are not limited to, satellite feeds, broadband connections and/or physical media. Alternatively, the I/O device 1508 is a card in the computer 1504.

As shown in FIG. 15, output from the I/O device 1508 is transmitted to a monitor 1512, a projector 1516 and/or eyewear 1520. The monitor 1512 and/or the projector 1516 optionally accept data in a format according to the SMPTE 259M, 292M specification and/or other specifications. For example, the I/O device can transmit data to a LG2001™ projector (Lasergraphics Incorporated, Irvine, Calif.), which supports a variety of digital formats and digital input from a serial digital input, e.g., a 75 ohm BNC SMPTE 292M compliant signal cable. The LG2001™ projector can display 1920 pixel by 1080 line resolution and also accept 16:9 high definition television signals in both 1080i and 720p formats. The LG2001™ digital projector also supports analog formats and inputs. Regarding monitors, consider the SyncMaster 240T (Samsung Electronics Co., Ltd, South Korea), which can operate as a computer monitor as well as a widescreen DVD or HDTV display monitor. This display monitor offers both digital and analog inputs and supports a variety of image resolutions including 1920 pixel by 1200 line. Of course, the output from the I/O device 1508 may also feed a plurality of monitors and/or projectors. In addition, the I/O device may also provide a sync signal for the eyewear 1520 or information for other stereoscopic display scheme operations.

Overall, the exemplary method 1500 demonstrates delivery and playing of high resolution video (e.g., having a 1280 pixel by 720 line image format or a 1920 pixel by 1080 line image format, e.g., at 24 fps). Of course, delivery and playing of lesser resolutions are also possible. This exemplary method 1500, for a 1280 pixel by 720 line image format and a 1920 pixel by 1080 line image format at 24 fps, provides 3-fold or 6-fold resolution increase, respectively, above standard definition DVD resolution at data rates below and/or equal to current DVD standard definition data rates. As already mentioned, the application of compression to various formats allow content to be stored on standard definition DVDs and transmitted through existing standard definition pathways, such as, but not limited to, IP in digital TV transmissions and/or satellite direct broadcast.

Figure 16:
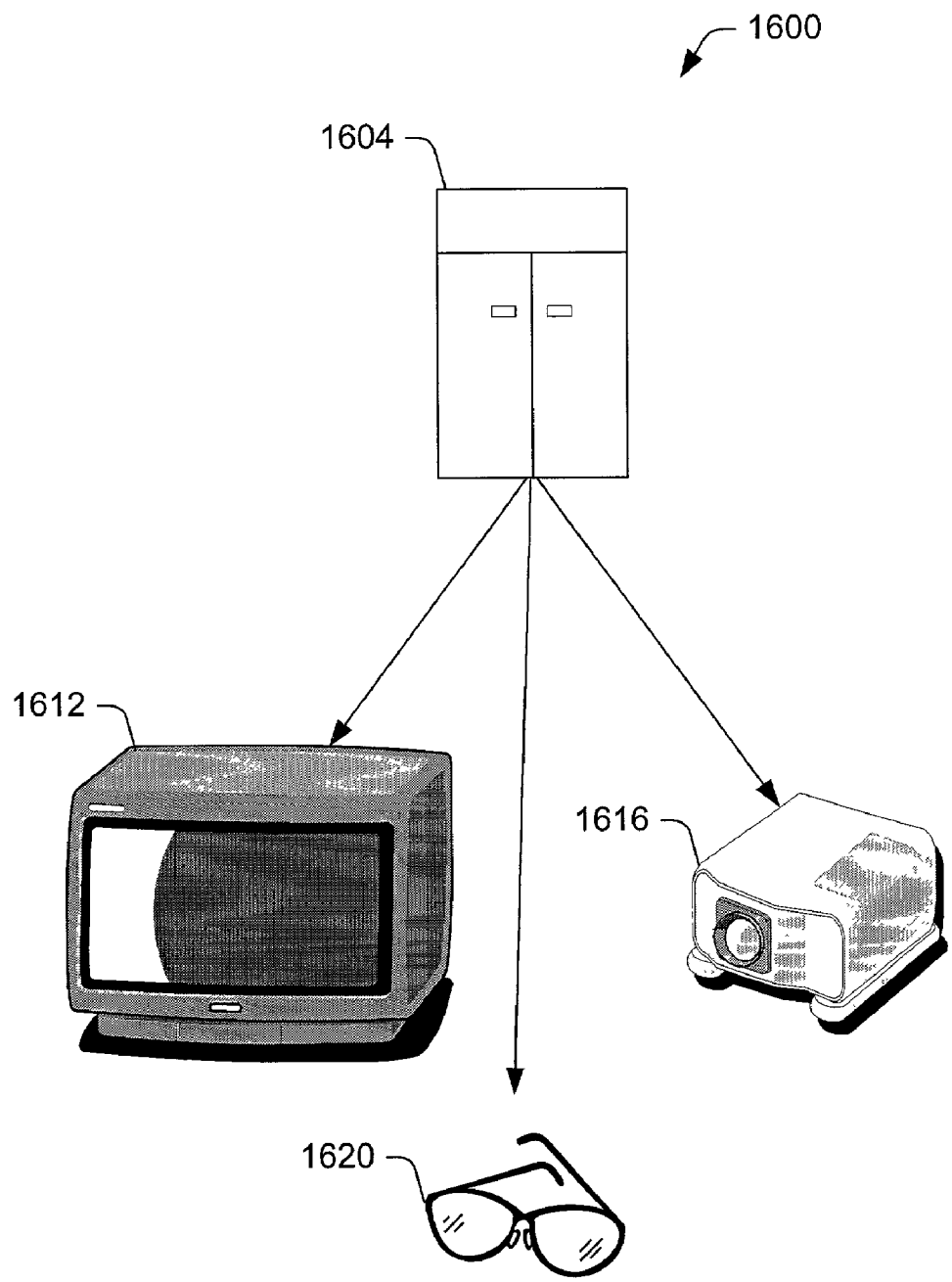
FIG. 16 is a block diagram illustrating an exemplary method for displaying stereoscopic video and/or audio data from a computer.

Another exemplary method 1600 is shown in FIG. 16 wherein a computer 1604 transmits data to a monitor 1612, a projector 1616 and/or eyewear 1620. In this exemplary method 1600, the computer 1604 receives data in an encoded format and/or converts data to a decompressed format. The computer 1604 also has software for decompressing (or decoding) data in a compressed (or encoded) format. After decompression (or decoding), video data are transmitted from the computer 1604 to the monitor 1612, the projector 1616 and/or the eyewear 1620. In general, the computer 1604 contains appropriate hardware and/or software to support display of video data via the monitor 1612 and/or via the projector 1616.

An exemplary monitor may support the video graphic array (VGA) and/or other display specifications or standards. In general, a VGA display system and other systems include sub-systems, such as, but not limited to, a graphics controller, display memory, a serializer, an attribute controller, a sequencer and a CRT controller. In the VGA display system, a computer CPU typically performs most of the work; however, a graphics controller can perform logical functions on data being written to display memory. Display memory can be of any suitable size, for example, display memory may include a bank of 256 k DRAM divided into 4 64 k color planes. Further, a VGA display system serializer receives display data from the display memory and converts it to a serial bit stream which is sent to an attribute controller. An attribute controller typically includes color tables, e.g., look up tables (LUTs) that are used to determine what color will be displayed for a given pixel value in display memory. A sequencer typically controls timings and enables/disables color planes. Finally, in a VGA display system, a CRT controller generates syncing and blanking signals to control the monitor display.

In a computer having two processors, a left image player optionally decompresses left image data in an encoded format on one processor and a right image player optionally decompresses right image data in an encoded format on the other processor. Such a dual processor computer may also include two framebuffers, one associated with each processor, wherein a single display device may display left and right image data alternately as dictated by data stored in the two framebuffers.

Recently, new specifications have arisen that include, but are not limited to, super extended graphics array (SXGA) and ultra extended graphics array (UXGA). The SXGA specification is generally used in reference to screens with 1280 pixel by 1024 line resolution; UXGA refers to a resolution of 1600 pixel by 1200 line. The older specifications (VGA and SVGA) are often used simply in reference to their typical resolution capabilities. The Table 4, below, shows display modes and the resolution levels (in pixels horizontally by pixels vertically) most commonly associated with each.

TABLE 4

Exemplary video display system specifications

| System | Pixel by Line Resolution |
|---|---|
| VGA | 640 × 480 |
| SVGA | 800 × 600 |

TABLE 4-continued

Exemplary video display system specifications

| System | Pixel by Line Resolution |
|---|---|
| XGA | 1024 × 768 |
| SXGA | 1280 × 1024 |
| UXGA | 1600 × 1200 |

Some monitors support higher resolutions, for example, consider the SyncMaster 240T (Samsung Electronics Co., Ltd, South Korea), which can operate as a computer monitor as well as a widescreen DVD or HDTV display monitor. This display monitor offers both digital and analog inputs. Regarding projection, the exemplary methods 1500 or 1600 optionally use a projector such as, but not limited to, the LG2001™ projector, which can display up to QXGA specification (e.g., 2048 pixel by 1536 line) resolution images directly from a computer. Of course, the output from the I/O device 1508 or the computer 1604 may also feed a plurality of monitors and/or projectors.

Figure 17:
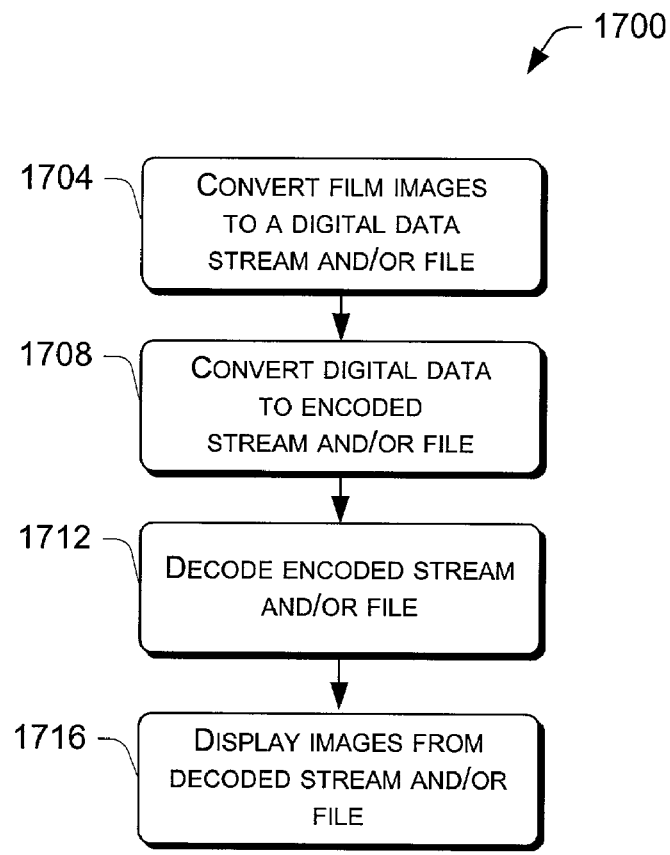
FIG. 17 is a block diagram illustrating an exemplary method for displaying video from a decoded stream and/or file.

An exemplary method for displaying images from film 1700 is shown in FIG. 17. In a conversion block 1704, film images are converted to a digital data stream and/or file(s). Next, in an encoding block 1708, the digital data stream and/or file(s) are converted (or encoded) to a format suitable for a stream(s) and/or a file(s). Following the conversion (or encoding) of encoding block 1708, in a decoding block 1712, the stream(s) and/or file(s) are converted (or decoded) to data in a digital and/or an analog video format suitable for display. Following the conversion (or encoding) of the decoding block 1712, the data in a digital and/or an analog format are displayed via a display block 1716.

According to the exemplary method 1700, film images (or frames) are optionally converted to digital data with an image format wherein one of the pixel or line sizes is at least approximately 352 or optionally at least approximately 720. These digital data are then optionally converted to a format for storage and then optionally encoded to a format (e.g., WINDOWS MEDIA™ format, etc.) suitable for use in a stream and/or file using encoding software, such as, but not limited to, aforementioned encoding software that uses a video codec. The encoded format stream and/or file is then locally and/or remotely decoded (e.g., using a suitable video codec) and optionally transmitted to a display device (e.g., a monitor, a projector, etc.) wherein the decoded video images are displayed with an image format wherein at least one of the pixel or line sizes is at least 352 or optionally at least approximately 720. In the case that the encoded format stream and/or file is transmitted and/or stored, decoding of the stream and/or file optionally includes padding (e.g., zero padding). Further, the encoded format stream and/or file optionally contain variable-bit-rate information.

Yet another exemplary method for displaying stereoscopic video includes interacting with a user. For example, during execution of a computer game, a user may optionally input information using an input device (e.g., joystick, etc.). In such an example, user input may affect the stereoscopic video by changing viewing angles, interaxial distance and/or other parameters related to a perceived 3D view.

Various exemplary methods, devices, systems, and/or storage media discussed herein are capable of providing quality equal to or better than that provided by MPEG-2, whether for DTV, computers, DVDs, networks, etc. In particular, various exemplary methods, devices, systems, and/or storage media discussed herein are capable of providing stereoscopic video having quality equal to or better than that provided by MPEG-2, whether for DTV, computers, DVDs, networks, etc. One measure of quality is resolution. Regarding MPEG-2 technology, most uses are limited to non-stereoscopic 720 pixel by 480 line (345,600 pixels) or 720 pixel by 576 line (414,720 pixels) resolution. In addition, DVD uses are generally limited to approximately 640 pixel by 480 line (307,200 pixels) for non-stereoscopic video. Further as mentioned in the background section, a 352 pixel by 480 line may be specified for MPEG-2. Thus, any technology that can handle a higher resolution will inherently have a higher quality. Note, however, that these resolutions are given for non-stereoscopic video; hence, they are generally inadequate for providing stereoscopic video at such resolutions. Accordingly, various exemplary methods, devices, systems, and/or storage media discussed herein are capable of handling stereoscopic video having a pixel and/or line resolution of at least approximately 352 and optionally of at least approximately 720. On this basis, various exemplary methods, devices, systems, and/or storage media achieve better video quality than MPEG-2-based methods, devices, systems and/or storage media.

Another quality measure involves measurement of peak signal to noise ratio, known as PSNR, which compares quality after compression/decompression with original quality. The MPEG-2 standard (e.g., MPEG-2 Test Model 5) has been thoroughly tested, typically as PSNR versus bit rate for a variety of video. For example, the MPEG-2 standard has been tested using the "Mobile and Calendar" reference video (ITU-R library), which is characterized as having random motion of objects, slow motion, sharp moving details. In a CCIR 601 format, for MPEG-2, a PSNR of approximately 30 dB results for a bit rate of approximately 5 Mbps and a PSNR of approximately 27.5 dB for a bit rate of approximately 3 Mbps. Various exemplary methods, devices, systems, and/or storage media are capable of PSNRs higher than those of MPEG-2 given the same bit rate and same test data.

Yet another measure of quality is comparison to VHS quality and DVD quality. Various exemplary methods, devices, systems, and/or storage media are capable of achieving DVD quality for 640 pixel by 480 line resolution at bit rates of approximately 500 kbps to approximately 1.5 Mbps for non-stereoscopic images and bit rates of approximately 1 Mbps to approximately 3 Mbps for stereoscopic video. In this example, for exemplary stereoscopic video, to achieve a 1 Mbps bit rate, a compression ratio of approximately 350:1 is required for a color depth of 24 bits and a compression ration of approximately 250:1 is required for a color depth of 16 bits. In this example, for exemplary stereoscopic video, to achieve a 3 Mbps bit rate, a compression ratio of approximately 120:1 is required for a color depth of 24 bits and a compression ratio of approximately 80:1 is required for a color depth of 16 bits. Where compression ratios appear, one would understand that a decompression ratio may be represented as the reverse ratio.

Yet another measure of performance relates to data rate. For example, while a 2 Mbps bit rate-based "sweet spot" was given in the background section (for a resolution of 352 pixel by 480 line), MPEG-2 is not especially useful at data rates below approximately 4 Mbps. For most content a data rate below approximately 4 Mbps typically corresponds to a high compression ratio, which explains why MPEG-2 is typically used at rates greater than approximately 4 Mbps (to approximately 30 Mbps) when resolution exceeds, for example, 352 pixel by 480 line. Thus, for a given data rate, various exemplary methods, devices, systems, and/or storage media are capable of delivering higher quality video and/or stereoscopic video. Higher quality may correspond to higher resolution, higher PSNR, and/or other measures.

Various exemplary methods, devices, systems and/or storage media are optionally suitable for use with games. While the description herein generally refers to "video" many formats discussed herein also support audio. Thus, where appropriate, it is understood that audio may accompany video. Although some exemplary methods, devices, and/or systems have been illustrated in the accompanying Drawings and described in the foregoing Detailed Description, it will be understood that the methods, devices, systems, and/or storage media are not limited to the exemplary embodiments disclosed, but are capable of numerous rearrangements, modifications and substitutions without departing from the spirit set forth and defined by the following claims.

What is claimed is:

1. A method comprising:
   providing stereoscopic video data;
   determining a resolution for display of the stereoscopic video data wherein the determining a resolution comprises receiving information related to a computer in communication with a computer network;
   determining a display scheme for the stereoscopic video data wherein the determining a display scheme comprises receiving information related to a computer in communication with the computer network; and
   transmitting the stereoscopic video data via the computer network at one or more bit rates based at least in part on the resolution and the display scheme.

2. The method of claim 1 further comprising scaling the stereoscopic video data based on the resolution.

3. The method of claim 1 wherein the transmitting the stereoscopic video data comprises transmitting compressed stereoscopic video data.

4. The method of claim 3 further comprising compressing the stereoscopic video data prior to the transmitting the compressed stereoscopic video data.

5. The method of claim 1 wherein a server performs the determining the resolution and the determining the display scheme via information received via the computer network.

6. The method of claim 1 wherein the display scheme optionally comprises an interlace display scheme.

7. The method of claim 1 wherein the display scheme optionally comprises a quad-buffering display scheme.

8. The method of claim 1 wherein the display scheme optionally comprises a full screen display scheme.

9. The method of claim 1 wherein the display scheme optionally comprises use of eyewear.

10. The method of claim 1 further comprising managing digital rights of the stereoscopic video data.

11. The method of claim 1 further comprising determining a number of processors associated with a computer in communication with the computer network.

12. The method of claim 11 wherein the one or more bit rates depend at least in part on the number of processors.

13. The method of claim 1 further comprising determining a number of players associated with a computer in communication with the computer network.

14. The method of claim 13 wherein the one or more bit rates depend at least in part on the number of players.

15. The method of claim 1 further comprising transmitting stereoscopic video data to more than one client computer via the computer network.

16. The method of claim 1 further comprising determining a compression ratio for the stereoscopic video data.

17. The method of claim 16 wherein the determining a compression ratio comprises receiving information related to a computer in communication with the computer network.

18. A computer-readable medium storing computer-executable instructions to perform, when executed by a computer:
   determining a resolution for display of stereoscopic video wherein the determining a resolution comprises receiving information related to a computer in communication with a computer network;
   determining a display scheme for the stereoscopic video wherein the determining a display scheme comprises receiving information related to a computer in communication with the computer network; and
   transmitting stereoscopic video data via the computer network at one or more bit rates based at least in part on the resolution and the display scheme.

* * * * *